United States Patent [19]

Kobori et al.

[11] Patent Number: 5,109,281
[45] Date of Patent: Apr. 28, 1992

[54] VIDEO PRINTER WITH SEPARATELY STORED DIGITAL SIGNALS PRINTED IN SEPARATE AREAS TO FORM A PRINT OF MULTIPLE IMAGES

[75] Inventors: Yasunori Kobori, Yokohama; Hiroyuki Kimura, Kanagawa; Kentaro Hamma, Yokohama; Toshihiko Gotoh, Tokyo; Satoshi Yoshida, Yokohama, all of Japan

[73] Assignee: Hitachi, Ltd., Tokyo, Japan

[21] Appl. No.: 652,252

[22] Filed: Feb. 6, 1991

Related U.S. Application Data

[63] Continuation of Ser. No. 198,074, May 24, 1988, abandoned.

[30] Foreign Application Priority Data

May 25, 1987 [JP] Japan ................................. 62-125921
Jul. 24, 1987 [JP] Japan ................................. 62-183281

[51] Int. Cl.⁵ ......................... H04N 1/21; H04N 1/23; H04N 1/387
[52] U.S. Cl. .................................... 358/296; 358/444; 358/450; 283/77
[58] Field of Search ............... 358/296, 302, 401, 909, 358/75, 77, 78, 80, 444, 450, 452, 453; 364/521; 355/20; 283/74, 75, 77

[56] References Cited

U.S. PATENT DOCUMENTS

| | | | |
|---|---|---|---|
| 4,037,249 | 7/1977 | Pugsley | 358/909 |
| 4,074,324 | 2/1978 | Barrett | 358/909 |
| 4,130,834 | 12/1978 | Mender | 358/335 |
| 4,161,749 | 7/1979 | Erlichman | 358/909 |
| 4,231,061 | 10/1980 | Freeman | 358/909 |
| 4,262,301 | 4/1981 | Erlichman | 358/909 |
| 4,263,623 | 4/1981 | Woo | 358/909 |
| 4,346,401 | 8/1982 | Ohara | 358/909 |
| 4,373,194 | 2/1983 | Demke | 364/900 |
| 4,511,929 | 4/1985 | Maeda | 358/335 |
| 4,575,766 | 3/1986 | Birnbaum | 358/244 |
| 4,591,904 | 5/1986 | Urabe | 358/75 |
| 4,651,227 | 3/1987 | Yunoki | 358/335 |
| 4,712,909 | 12/1987 | Oshikoshi | 355/20 |
| 4,733,311 | 3/1988 | Yoshinaka | 358/337 |
| 4,740,833 | 4/1988 | Shiota | 358/909 |
| 4,768,103 | 8/1988 | Nakamura | 358/337 |
| 4,769,694 | 9/1988 | Oshikoshi | 358/75 |
| 4,780,756 | 10/1988 | Shiota | 358/909 |
| 4,794,460 | 12/1988 | Shiota | 358/332 |
| 4,805,037 | 2/1989 | Noble | 358/909 |
| 4,823,289 | 4/1989 | Hirosawa | 358/75 |

FOREIGN PATENT DOCUMENTS 43281 2/1987 Japan .

*Primary Examiner*—Benjamin R. Fuller
*Assistant Examiner*—Scott A. Rogers
*Attorney, Agent, or Firm*—Antonelli, Terry, Stout & Kraus

[57] ABSTRACT

A video printer is disclosed. An input video signal is converted into a digital signal and stored in a memory. The write/read operation and memory addresses of the memory are controlled by a memory control unit. The signal read out of the memory is converted into print data, and an image is printed by a printer. The print data and the printing operation are controlled by a print control unit, and at least a part of the memory areas of the memory is controlled in the write operation by an area control unit.

13 Claims, 27 Drawing Sheets

FIG. 2
MONITOR             PRINT
(a-1)             (a-2)
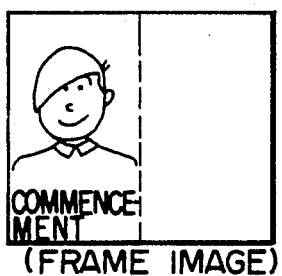 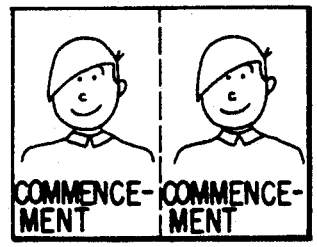
(FRAME IMAGE)
(b-1)             (b-2)
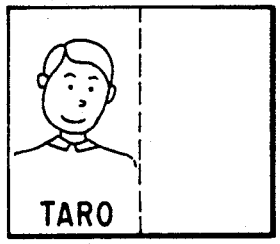  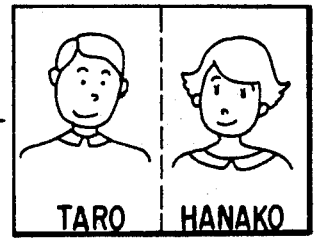
(FIELD A)     (FIELD B)
(c-1)             (c-2)
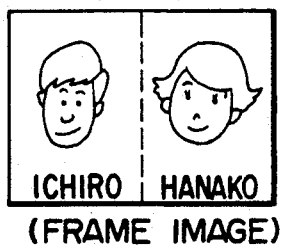 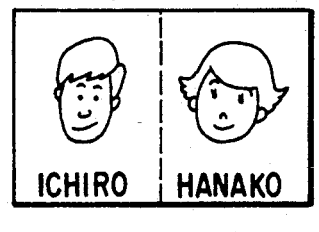
(FRAME IMAGE)
(d-1)             (d-2)
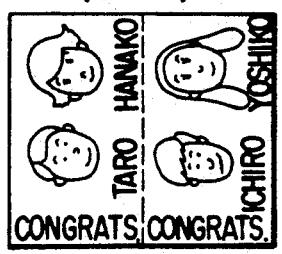 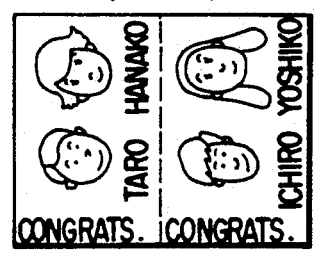

FIG. 13
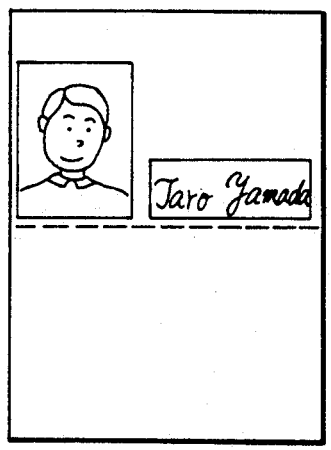
(a)
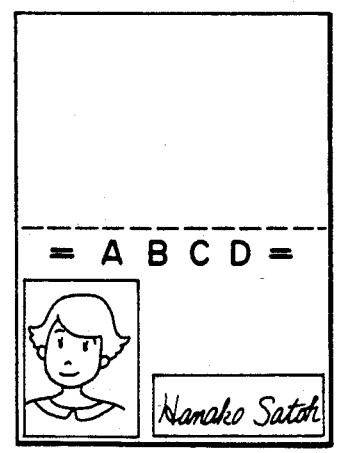
(b)
FIG. 15
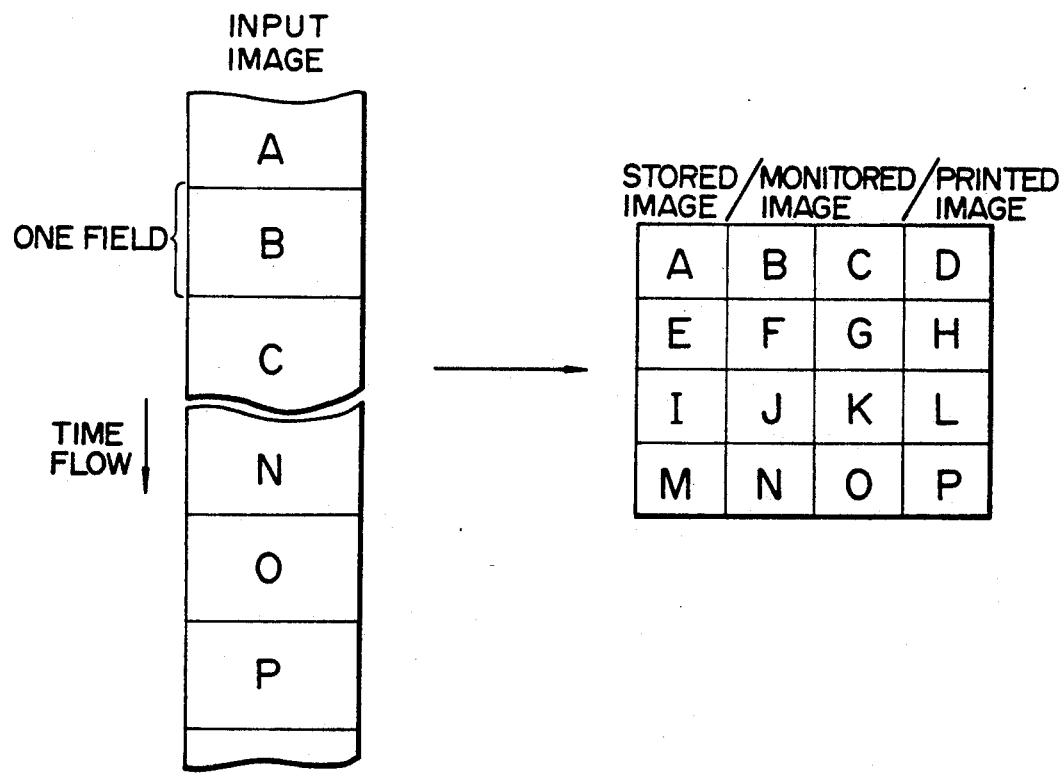

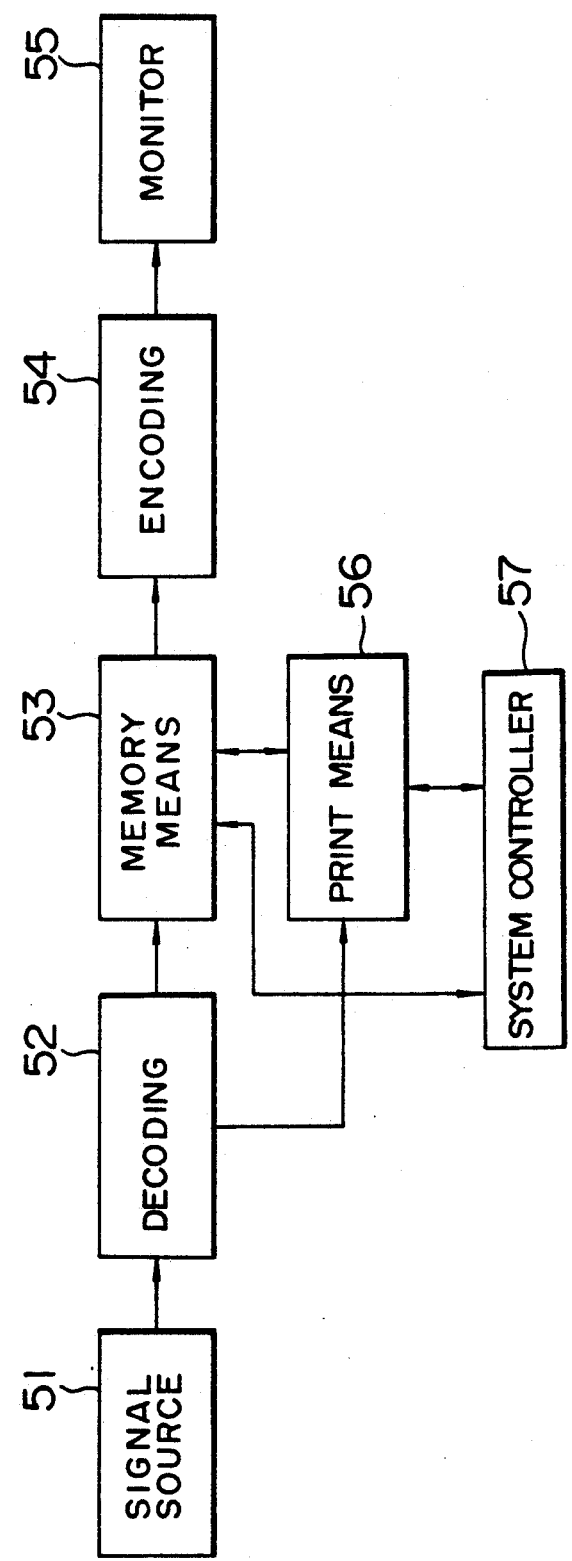

| n-3, m-3 | n-3, m-2 | n-3, m-1 | n-3, m |
|---|---|---|---|
| n-2, m-3 | n-2, m-2 | n-2, m-1 | n-2, m |
| n-1, m-3 | n-1, m-2 | n-1, m-1 | n-1, m |
| n, m-3 | n, m-2 | n, m-1 | n, m | n (b)

| n-2, m-3 | n-2, m-2 | n-2, m-1 | n-2, m |
|---|---|---|---|
| n-1, m-3 | n-1, m-2 | n-1, m-1 | n-1, m |
| n, m-3 | n, m-2 | n, m-1 | n, m |
| n+1, m-3 | n+1, m-2 | n+1, m-1 | n+1, m | n+1

FIG. 27
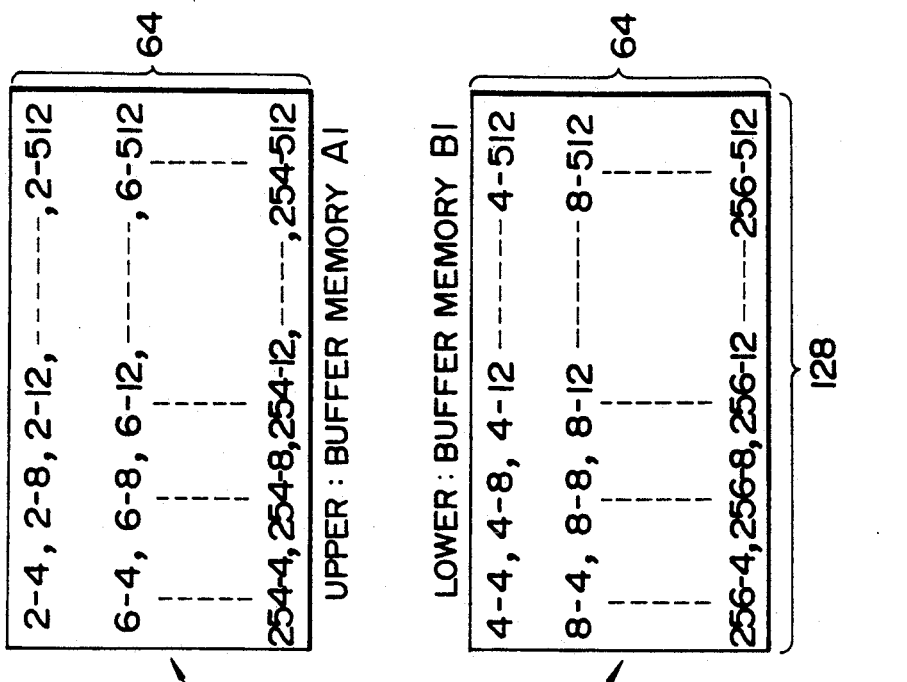
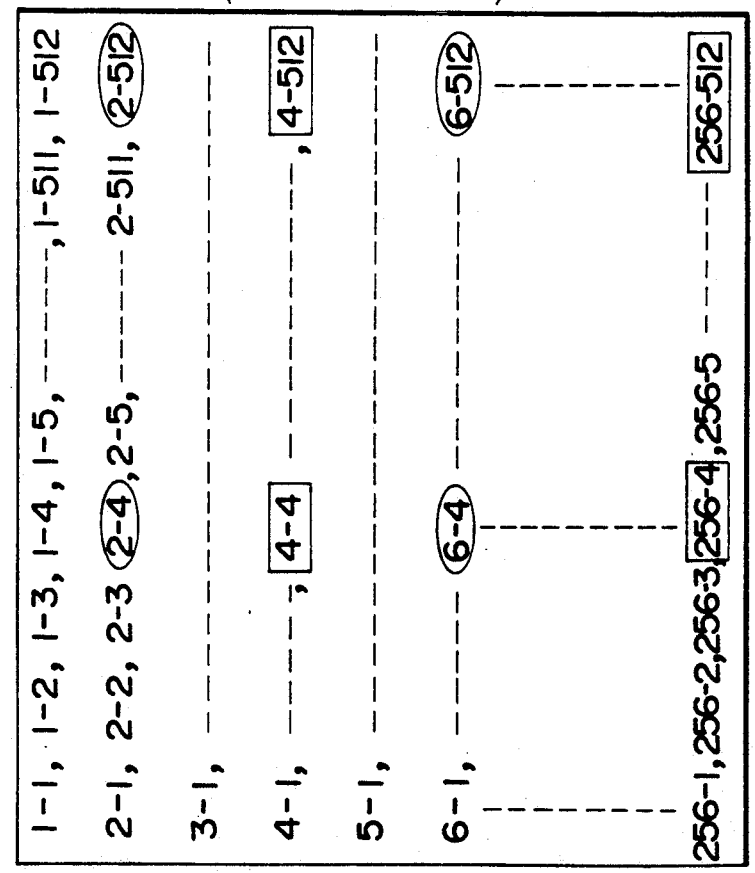

FIG. 30
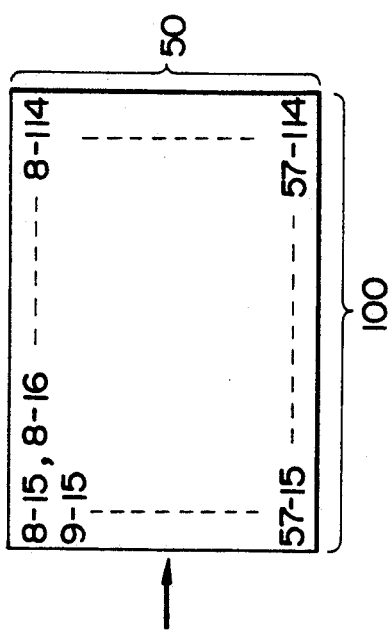
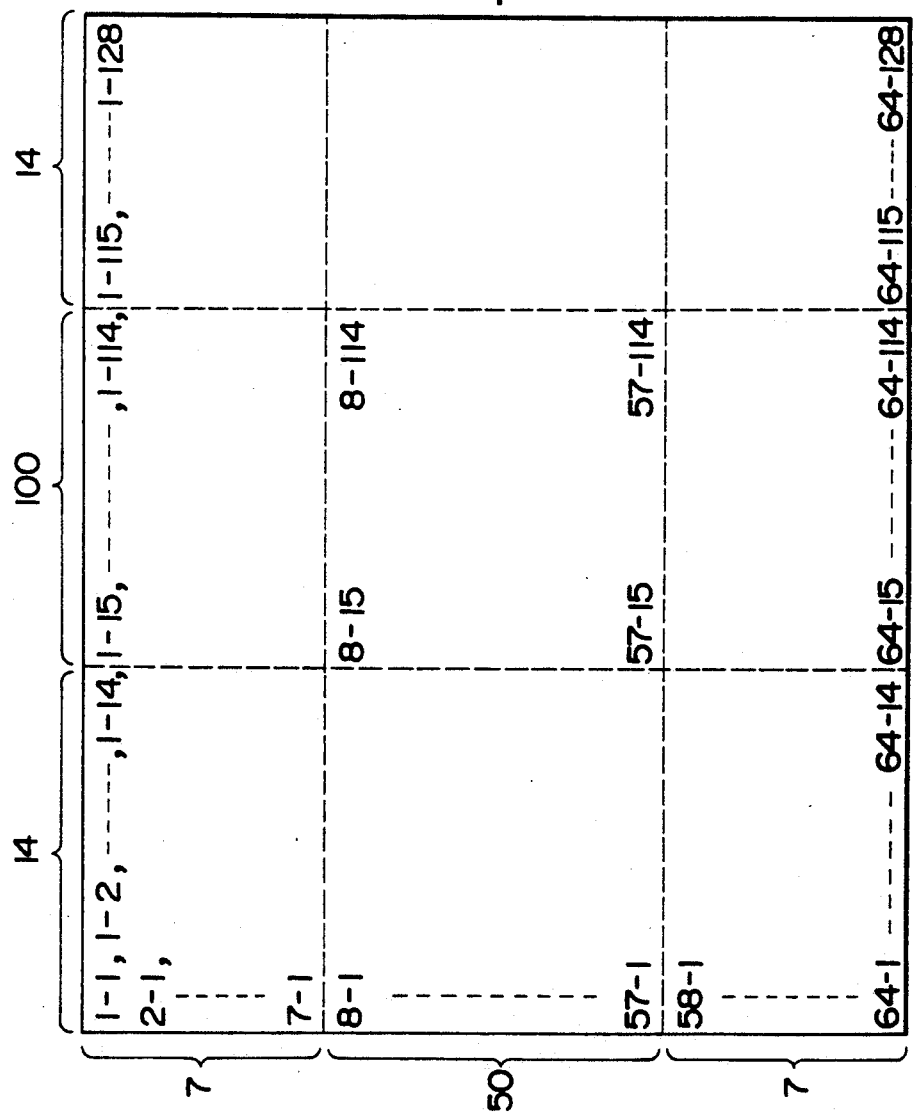
(a) REDUCED DATA TO BE STORED IN A BUFFER MEMORY
(b) REDUCED DATA HELD IN A BUFFER MEMORY

VIDEO PRINTER WITH SEPARATELY STORED DIGITAL SIGNALS PRINTED IN SEPARATE AREAS TO FORM A PRINT OF MULTIPLE IMAGES

This application is a continuation of application Ser. No. 07/198,074, filed May 24, 1988, now abandoned.

BACKGROUND OF THE INVENTION

1. Field of the Invention

The present invention relates to a system for producing an output of a video camera, or the like in hard copies. More in particular, the present invention related to a video printer adapted for printing a plurality of images in a screen of print which may be cut appropriately according to a particular application.

2. Description of the Prior Art

Conventional systems of similar type, as disclosed in JP-A-62-43281, are so configured that a video image and data from a personal computer are combined to produce a single sheet of image print for each printing operation.

The prior art systems, which do not take into consideration the printing of a plurality of images on a single sheet of print, have the problem that only a single card is printable at a time, in spite of the availability of the printing area covering two cards, for example. Further, no consideration is given to the possibility of printing a plurality of different images on a sheet of print from corresponding different images stored sequentially in an image memory. The conventional systems require a sheet of print for each image and thus are high in printing cost.

SUMMARY OF THE INVENTION

The object of the present invention is to provide means for printing a plurality of images or a single sheet of print.

In order to achieve the above-mentioned object, there is provided according to the present invention a video printer comprising means for twice printing the right or left part of an image stored in an image memory, thereby to produce a single print of the two same images. Further, an image divided into two independent parts, right and left, or a plurality of independent parts in four directions is stored in an image memory and printed thereby to achieve multiple prints of independent images. Furthermore, an image in memory is printed thinned out or shortened in the vertical or horizontal direction to attain multiple prints of the same image.

Printing control means for controlling a print line operates in such a manner as to print a left-handed image following the same left-handed image. As a result, it is possible to produce two prints of the same image by printing twice the left half part of an image stored in memory.

Further, the memory control means actuates separately a plurality of areas where an image memory is written, and therefore multiple memories and, multiple prints of independent images are provided.

BRIEF DESCRIPTION OF THE DRAWINGS

FIG. 2 is a diagram useful in explaining the present invention.

FIG. 13 is a schematic diagram useful in explaining the operation for producing a print on one of the two parts into which the print is divided.

FIG. 14 is a block diagram showing a still further embodiment of the present invention.

FIGS. 15 to 18 are schematic diagrams useful in explaining the operation of the present invention.

FIG. 24 is a schematic diagram useful in explaining the operation of the embodiment of FIG. 23.

FIG. 27 is a schematic diagram useful in explaining the operation of the embodiment of FIG. 26.

FIG. 30 is a schematic diagram for explaining the operation of the same embodiment.

DESCRIPTION OF THE PREFERRED EMBODIMENTS

Figure 1:
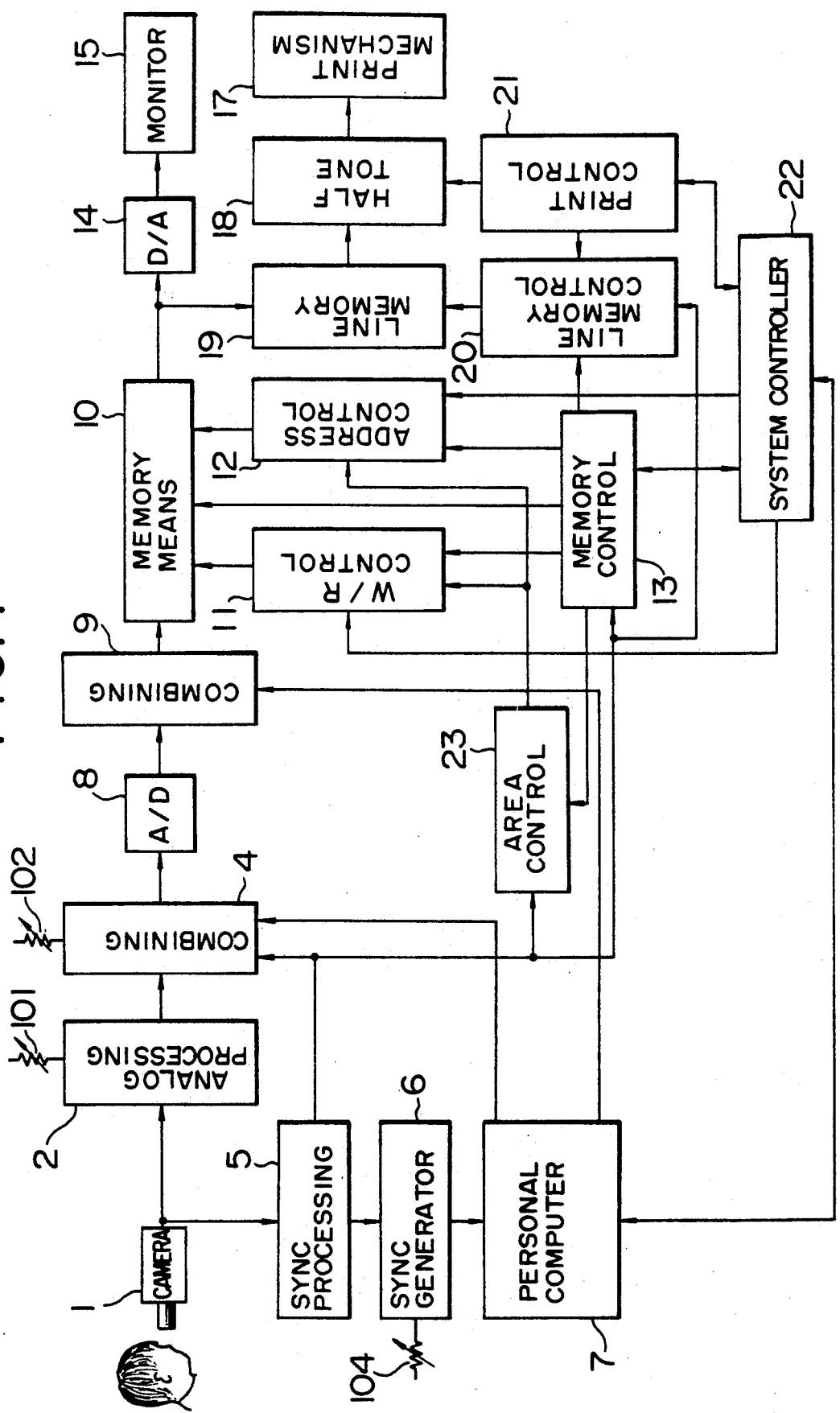
FIG. 1 is a block diagram showing an embodiment of the present invention.

An embodiment of the present invention will be described below with reference to FIG. 1. In FIG. 1, reference numeral 1 designates an image signal source such as a video camera, numeral 2 analog processing means, numeral 4 analog combination means, numeral 8 analog/digital conversion means (hereinafter referred to as an A/D converter), numeral 5 sync signal processing means, numeral 6 sync signal generation means, numeral 7 a personal computer (hereinafter sometimes called simply a computer. Numeral 9 digital combination means, numeral 10 memory means, numeral 11 write/read (W/R) control means, numeral 12 address control means, numeral 13 memory control means, numeral 22 a system controller, numeral 21 print control means, numeral 20 line memory control means, numeral 19 a line memory, numeral 18 intermediate tone control means, numeral 17 a print mechanism, numeral 14 digital/analog, conversion means (hereinafter referred to as a D/A converter), numeral 15 a monitor and numeral 23 memory area control means for adaptation to a position for memory.

Now, the operation of this system will be explained. A video signal from the signal source 1 is applied to the analog processing means 2, including adjusting means 101 for amplitude control (contrast adjustment), and DC level adjustment (brightness adjustment) thereby to produce signals representing the three primary colors of red (R), green (G) and blue (B). The RGB signals are combined with the character data including characters and symbols, from the personal computer 7 at the analog combination means 4. At the same time, the character data level from the computer 7 is adjusted by the adjusting means 102. In the process, a sync signal is separated from the video signal of the signal source 1 by the sync signal processing means 5, and the sync signal generation means 6, together with timing adjusting means 104, adjust the timing in the vertical and horizontal directions. A composite sync signal is thus produced and applied to the personal computer 7. The computer 7 produces character data with the composite sync signal as a reference.

The output of the analog combination means 4 is converted into a digital data at the A/D converter 8 in the next stage, and further combined with digital data from the personal computer 7 at the digital combination means 9. The combined data is written in real time in the memory means 10 in response to a write (W) command from the system controller 22. In the process, the memory means 10 is directly controlled by the W/R control means 11 and the address control means 12, and the write area (the memory area associated with the memory means 10) of the combined data is subjected to the instruction from the memory control means 13. At the same time, the position of an object at the signal source 1 is distributed, for example, automatically between the right and left sections by the memory area control means 23.

The combined data written in the memory means 10 is read in real time in response to a read (R) command from the system controller 22. The data thus read out is restored to an analog video signal through the D/A converter 14 or demodulated to a video signal by means of the RGB signal or by use of encoder means (not shown) and displayed on the monitor 15. On the other hand, the read data for a line to be printed is written in the line memory 19 in response to a print command from the system controller 22. In the process, the designation of the line taken into the line memory 19 and the address control of the line memory 19 are effected by the line memory control means 20. Upon completion of writing a line of data, the data is immediately transferred to the next half tone control means 18 for conversion to an half tone signal commensurate with the input data, which signal is supplied to the print mechanism means 17. The manner of control by the line memory control means 20 and the direction of data conversion in the half tone control means are determined by the print control means 21.

The video signal written in the memory means 10 by the above-mentioned operation permits output of a variety of images as shown in FIG. 2 depending on the operation mode of the memory control means 13 and the W/R control means 11. More specifically, in FIG. 2, assume that (x−1) shows an image on the monitor, and (x−2) the image as printed. In the case or (a), an image to be printed is stored in the right or left half (the left in the case under consideration shown in FIG. 2) of a frame in the memory means 10, and the same image is printed in the right and left parts of the same frame as printed, as shown in (a−2). If two fields A and B of the same frame are used to store different objects as shown in FIG. 2(b−1), for example, two different field images are printed in the right and left parts. Further, in an application of the technique of FIG. 2(c), independent images are written in the right and left parts of a single frame of the memory means, which images are printed to produce a print of frame images independent of each other in the right and left parts as shown in (c−2). In the shown cases of printing, the images of objects are vertical. If the video camera making up the signal source 1 is turned by 90°, however, two laterally long images are obtained in the two parts, upper and lower, in quite the same manner as shown in FIG. 2(d). In the process, the character data from the personal computer 7 is produced also as lateral arranged characters. In the description of FIG. 2, each image of an object is designated for the right or left half area. This is achieved by changing the position of the objects or the angle of the video camera. As an alternative, with an object positioned at the center of the video camera, the memory area control means 23 is operated in interlocked relationship with the W/R control means 11 to distribute images automatically in the right and left parts for storage.

Figure 3:
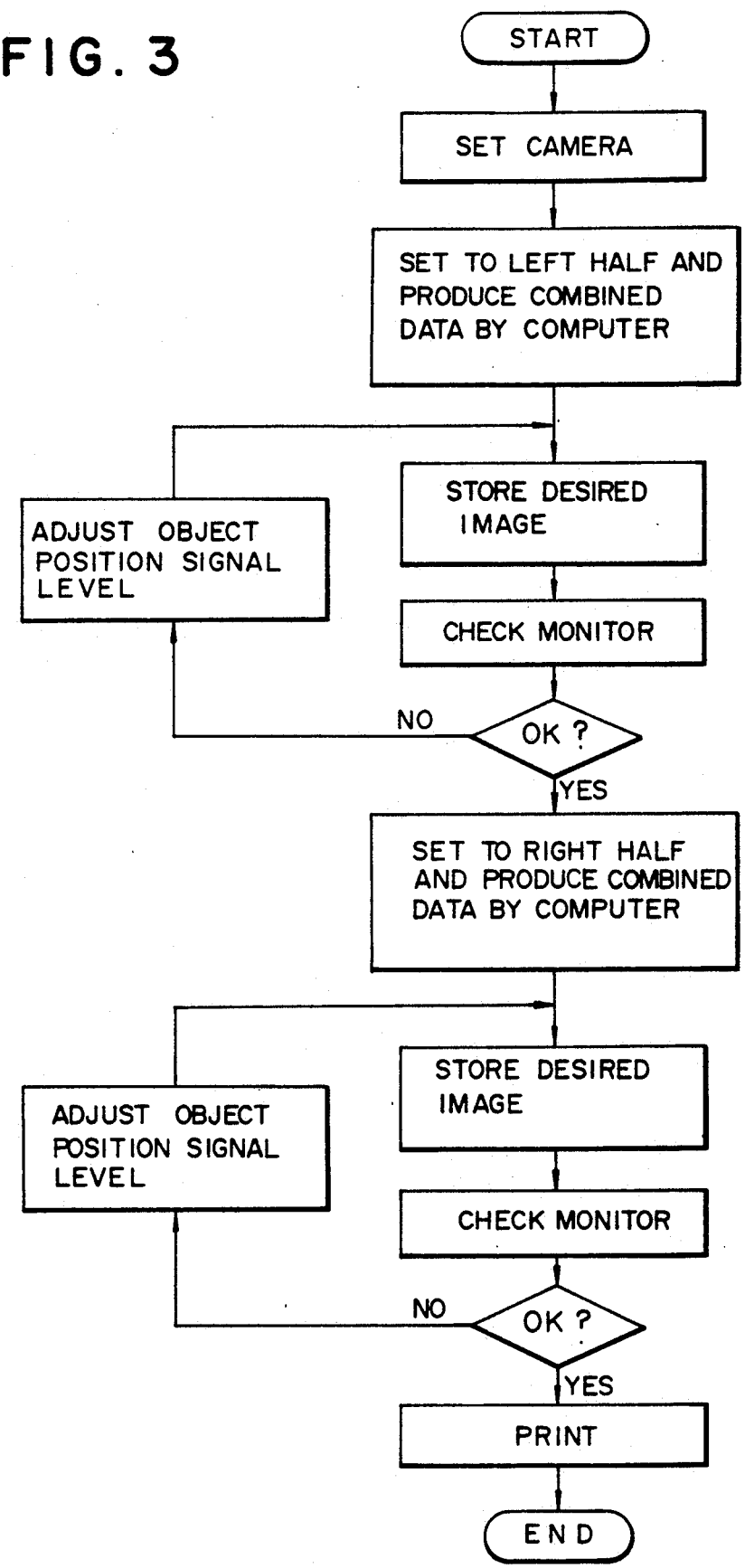
FIG. 3 is a flowchart for explaining the operation of the system according to the present invention.

The steps of operation in the embodiment shown in FIG. 1 are shown by the flowchart in FIG. 3. This flowchart is associated with the case of (c) or (d) in FIG. 2. First, the video camera making up the signal source 1 is set to position an object (an image to be taken) at the center of the camera. The computer produces an area designation signal for storing an image in the left half part, together with data such as characters to be combined. An object is held in the memory means 10, and the monitor 15 checks the position, brightness and contrast of the object and the position of insertion of characters. If the check by the monitor 15 proves unsatisfactory, the above-mentioned conditions are readjusted and held again in the memory means 10. The monitor 15 checks again. This process is repeated until satisfactory conditions are attained. After that, the computer 7 switches and produces the area designation signal to designate the right half part, while at the same time changing and producing the position and contents of the combined data. In the same manner as storage in the left half part, the conditions are changed until they become satisfactory on the monitor 15, and the result stored. When the conditions for both the right and left images become satisfactory, a print command is issued from the personal computer 7 to the system controller 22 thereby to proceed with the printing step for production of a print.

Figure 4:
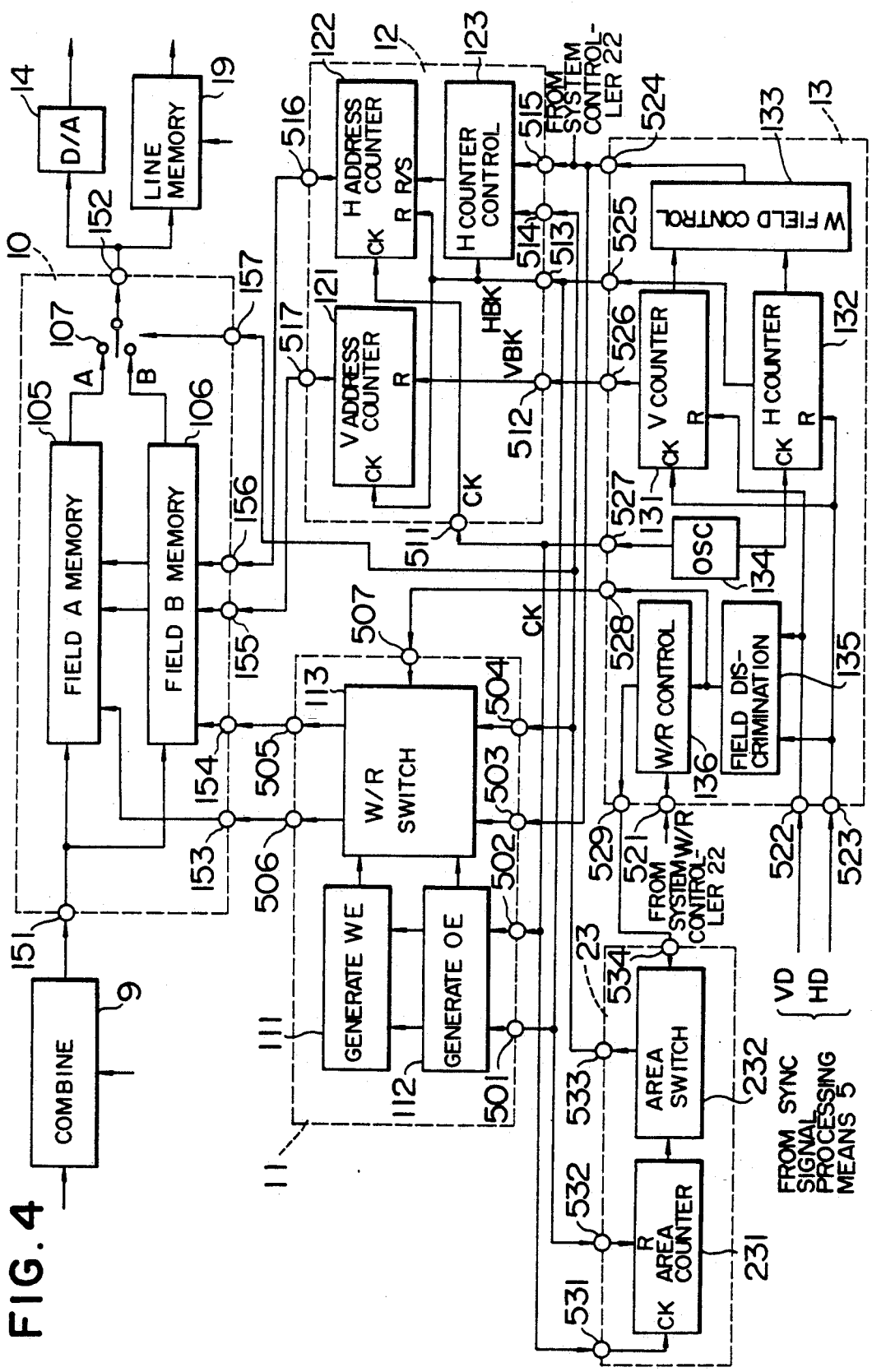
FIG. 4 is a block diagram showing the parts surrounding the memory means in FIG. 1 according to an embodiment of the invention.

The memory means 10, the W/R control means 11, the address control means 12, the memory control means 13 and the memory area control means according to an embodiment shown in FIG. 1 are illustrated in FIG. 4. The configuration of FIG. 4 is an embodiment for providing the double-segmented prints of FIG. 2. In FIG. 4, the memory means 10 includes a field A memory 105, a field B memory 106, and a memory output selector 107. The W/R control means 11 includes write enable (WE) generation means 111, output enable (OE) generation means 112 and the W/R switching means 113. The address control means 12, on the other hand, includes a vertical (V) address counter 121, a horizontal (H) address counter 122 and H counter control means 123. The memory control means 13 includes a vertical (V) counter 131, a horizontal (H) counter 132, write (W) field control means 133, clock generation means 134, field discrimination means 135 and W/R control means 136. The memory area control means 23 includes an area counter 231 and area switching means 232.

Now, the operation will be explained. First, in a normal printing operation, a digital video signal from the digital combination means 9 is written in the field A memory 105 and the field B memory 106 in the memory means 10. In the process, the field A in the video signal is written in the field A memory and the field B in the video signal is written in the field B memory 106. The distribution between the memories 105 and 106 is effected by the W/R switching means 113 in the W/R control means 11 in response to the field discrimination signal from the memory control means 13. The designation of a frame in the video signal to be written in the memory means 10, on the other hand, is effected by the W/R control means 11 through the memory control means 13 in response to a signal from the system controller 22. In similar manner, in compliance with a read command from the system controller 22, the memory means 10 is read out by the W/R control means 11 through the memory control means 13. In the process, the field A memory 105 and the field B memory 106 are read out simultaneously and are selectively produced as an output for each field by the memory output selector 107.

In the W/R control means 11, a WE signal from the WE generation means 111 and an OE signal from the OE generation means 112 are appropriately switched between the field A memory 105 and the field B memory 106 by the W/R switching means 113. In normal procedures of storing and printing, the R mode prevails if the W mode is designated. The W/R switching means 113 is controlled by a field signal (terminal 503) from the memory control means 13, a field discrimination signal (terminal 502) and an area signal (terminal 504) from the memory area control means 23. In the address control means 12, on the other hand, the addresses of the memory means 10 are controlled. The V address counter 121 is associated with addresses along the vertical direction as viewed on the monitor and is operated similarly for both write and read modes. The H address counter 122 controls the addresses along the horizontal direction and in the W mode designates only the left or right half part as shown in FIG. 2. In R mode, the address reading for only the left half part is effected in the case of FIG. 2(a) and that for the whole screen, like in normal reading, in the case of FIGS. 2(b) to (d). The right and left designations in W/R modes is effected by the H counter control means 123. In the memory control means 13, an area and a field (or a frame) for a video signal written in the memory means 10 is controlled, a sampling clock signal is generated, and the W/R area is controlled. First, a write field or frame is designated by the W/R control means 136, so that even- and odd-numbered fields are correctly written in and read from the field A memory 105 and the field B memory 106 in response to an output signal from the field discrimination means 135. Also, the area of a video signal to be written in the memory means in a field is controlled by the V counter 131, the H counter 132 and the W field control means 133. The sampling clock generation means 134 may be either an oscillator in synchronism with the input HD or an oscillator that is reset with each HD input.

In the area control means 23, the right and left areas of a screen (the right and left areas in FIG. 2) are switched and designated. The area counter 231 divides the screen into right and left areas which are controlled by the area switching means 232.

Figure 5:
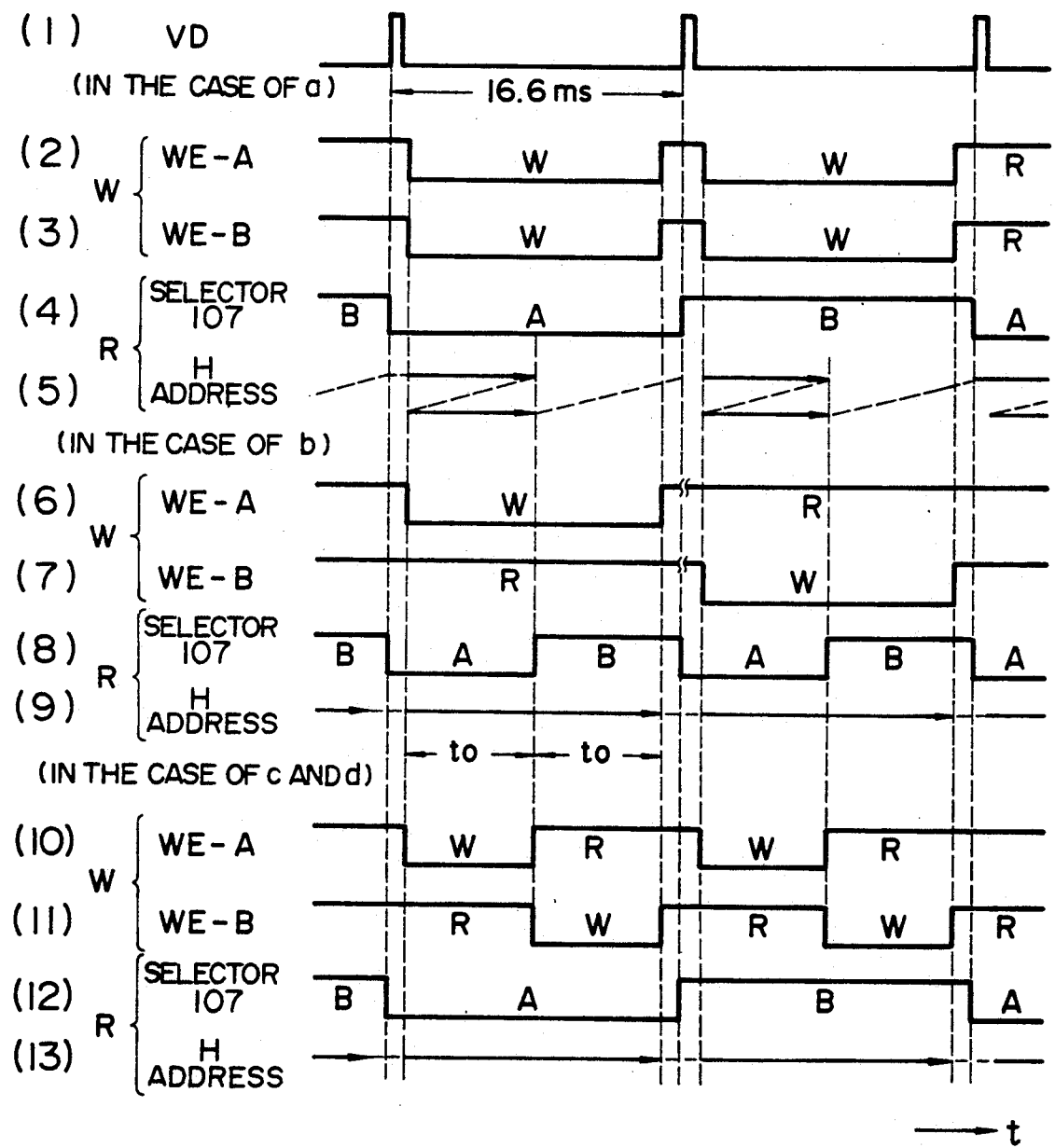
FIG. 5 shows waveforms useful in explaining the operation.

Now, explanation will be made of the operation of the various parts for producing print samples shown in FIG. 2. Waveforms produced at the essential parts are shown in FIG. 5. First, in the case of FIG. 2(a), an object (a portrait in the case under consideration) is arranged in the left half on the monitor 15 and is stored in the memory means 10. In the process, the data is written in all the areas including the right and left parts (2 and 3 in FIG. 5) or only in the left half part by being controlled by the area control means 23. At the time of reading, an area signal (terminal 533) from the area control means 23 causes the H counter control means 123 of the address control means 12 to control the H address counter 122 to represent a count of two left half parts (5 in FIG. 5). (For instance, the most significant bit (MSB) output of the H address counter 122 is fixed to "L"). In the case where an object is stored in the right half part of the memory means 10, on the other hand, the count of the H address counter 122 is controlled to represent two right half parts. (For instance, the MSB output of the H address counter 122 is fixed to "H"). In the aforementioned process, the W/R control means 11 is operated in quite the same way as in a normal printing operation with a normal frame signal stored (2, 3 and 4 in FIG. 5).

In the case of FIG. 2(b), different images are stored independently in the two field memories 105 and 106 of the memory means 10. In the process, the WE signal from the WE generation means 111 is produced only for one field according to the field discrimination signal (terminals 528, 507) applied from the field discrimination means 135 to the W/R switching means 113 (6 or 7 in FIG. 5). The images are stored in the field memories 105 and 106 in such a manner as to locate the objects in the left half part for the field A and in the right half part for the field B as shown in FIG. 2, for example. (This relationship may be reversed). In reading the memory means 10, the memory output selector 107 is switched between the right and left half parts of the screen (8 in FIG. 5). More specifically, the selector 107 is connected to A side while the left half of the memory is being read, and to the B side while the right half part is being read. This switching signal (terminal 157) is supplied from the area control means 23.

In the case of FIGS. 2(c) and (d), the right and left half parts are written in the field memories 105 and 106 of the memory means 10 sequentially (10 and 11 in FIG. 5). For writing the right and left half parts, the operation is controlled by the W/R switching means 113 in the W/R control means 11. The areas in the right and left parts are designated by the system controller 22. In the read mode, the areas of the whole memories are read and printed in the same manner as in normal printing process (12 and 13 in FIG. 5).

Figure 6:
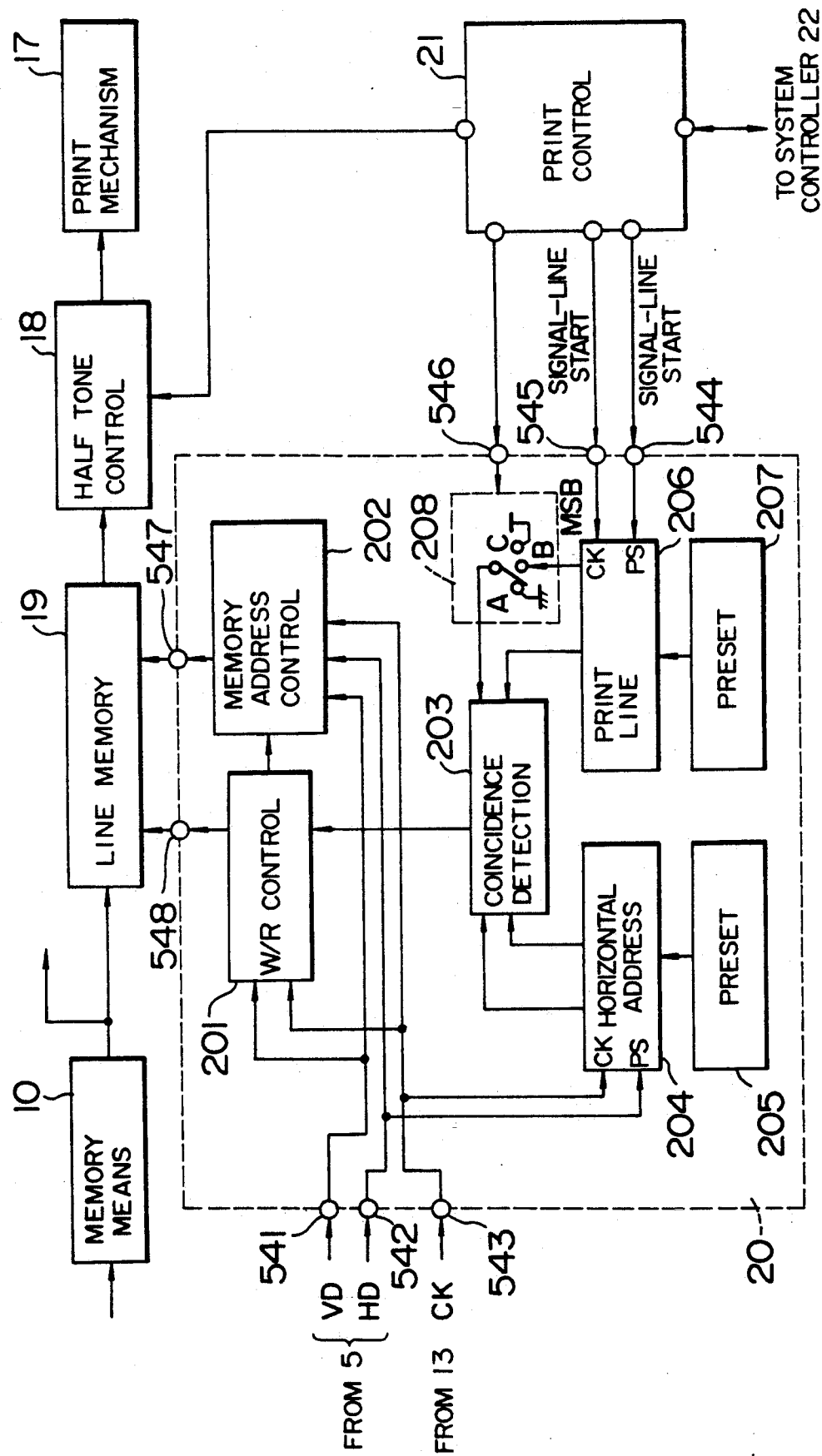
FIG. 6 is a block diagram showing the line memory control means in FIG. 1 according to an embodiment of the present invention.

The line memory control means 20 for providing the print of FIG. 2(a) according to an embodiment is shown in FIG. 6. In FIG. 6, numeral 201 designates W/R control means, numeral 202 memory address control means, numeral 203 coincidence detector means, numeral 204 a horizontal address counter, numeral 205 horizontal preset means, numeral 206 a print line counter, numeral 207 print line preset means, and numeral 208 an MSB (Most Significant Bit) selector.

Now, the operation of this embodiment will be explained. The memory means 10 constantly produces data for reading the three colors RGB in real time at a rate permitting normal display on the monitor. Out of these three-color data, the data portion representing one color to be printed is selected by the line memory 19, and the vertical or horizontal line data required for printing a line is stored in the line memory 19. The timing at which the one-line data is retrieved is controlled by the W/R control means 201, and the memory address of the line memory 19 by the memory address control means 202.

First, explanation will be made about the operation of the line memory control means 20 in the printing operation. Assume that the image on the monitor is printed for each color rightward from the extreme left end line by line vertically. The position of the vertical line that is the horizontal position on the monitor (the time difference from the horizontal sync point at the extreme left edge on the monitor) is counted by the horizontal address counter 204 on the one hand, and the position next to be printed on the printing paper (the distance along the vertical print line from the left edge in the print result or the number of print lines from the left edge) is counted by the print line counter 206. The print line counter 206 is preset (PS) by a single-color start signal (terminal 544) from the print control means 21 to proceed with counting with a single-line start signal (terminal 545) as a clock (CK). In other words, the counting is made for each line printed. The horizontal address counter 204, on the other hand, is preset by an HD signal (terminal 542) from the sync signal processing means 5, thereby to count clock pulses CK (terminal 543). In other words, the counter 204 counts the time from the HD signal. The preset value is determined by the preset means 205. Specifically, if the count on the print line counter 206 is N, it indicates that the next line to be printed is the N-th line. At the same time, the counts on the horizontal address counter 204 and the print line counter 206 (bit outputs of the counters) are applied to the coincidence detection circuit 203 respectively. When these two counts coincide with each other, the coincidence detection means 203 sends a coincidence signal to the W/R control means 201. The W/R control means 201 applies a write (W) signal to the line memory 19 and the memory address control means 202 only when it receives a coincidence signal. The memory address control means 202 thus designates a predetermined write address, and the line memory 19 writes therein a pixel of data out of the data applied thereto. This write operation is effected once every horizontal period so that data representing one vertical line is taken in during one frame period. Subsequently, the W/R control means 201 enters the R mode and transfers data to the half tone control means sequentially. In the aforementioned processes of operation, the MSB selector 208 is connected to the contact B.

Now, the operation for producing a print shown in FIG. 2(a) is explained. The MSB selector 208 is connected to the contact A. First, a one-color start signal is applied to the terminal 544, and the image on the left half part is printed in the same manner as a normal print. Subsequently when the MSB output of the print line counter 206 is reversed (such as at the 257th line for printing 512 lines), the MSB signal of the print line counter 206 applied to the coincidence detection means 203 is fixed to the "L" level by the MSB selector 208, and therefore the line next to be printed corresponds to the first line. As a result, even when the right half is printed, the coincidence detection means 203 retrieves the left half image at "L" level into the line memory 19. As shown in FIG. 2($a-2$), therefore, the left half image (FIG. 2($a-1$)) on the monitor is printed on both the right and left parts of the screen in exactly the same manner.

When the MSB selector 208 is connected to the contact C, the right half image on the monitor is printed in the two parts. In other words, even during printing the left half part, in view of the fact that the MSB of the print line counter 206 applied to the coincidence detection means 203 is at "H" level, the coincidence signal is produced only at the timing of the right half part on the monitor. This process is repeated twice to print two copies of the same image. The MSB selector 208 is controlled by the system controller 22 through the print control means 21.

In the process of operation explained above, it is necessary to displace the position of the object rightward or leftward if it is to be photographed by the camera. In the case of FIGS. 2(b) to (d), on the other hand, the position of the object is required to be moved rightward or leftward, or the camera angle must be switched between right and left. An improvement on this operation according to another embodiment is described below.

Figure 7:
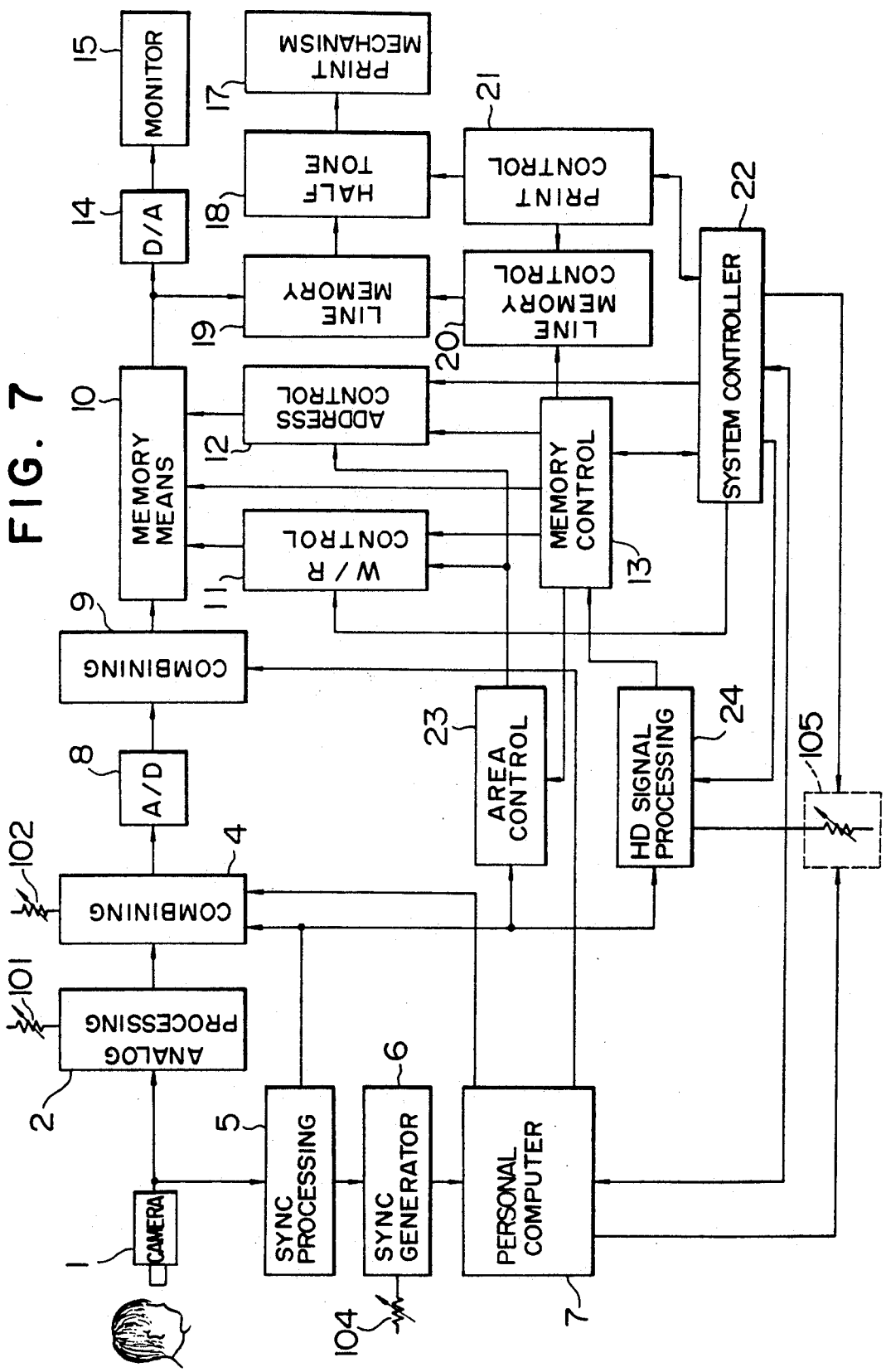
FIG. 7 is a block diagram showing another embodiment of the invention.

Such another embodiment of the present invention is shown in FIG. 7. In FIG. 7, those component parts having the same functions as corresponding parts in FIG. 1 are designated with the same reference numerals as in FIG. 1, respectively. FIG. 7 shows a configuration comprising HD signal processing means 24 and position adjusting means in addition to all the component parts in FIG. 1. The HD signal processing means 24 is adapted to switch and delay the HD signal from the sync signal processing means 5 as required to supply the memory control means 13. The function of the HD signal processing means 24 is to move to and store in the left half or right half part of the memory means 10 automatically the image of the object photographed at the center of the camera view (in the relationship between the camera view and stored image in FIG. 8).

Figure 8:
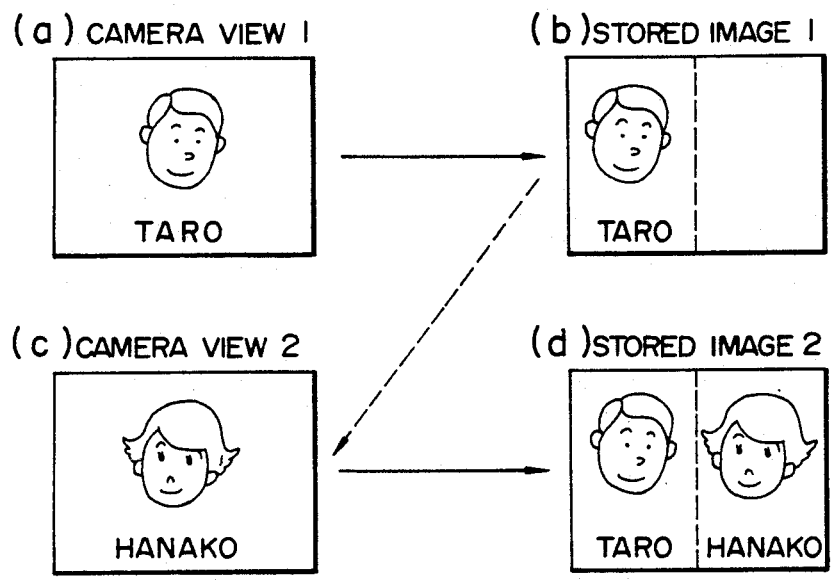
FIG. 8 is a diagram useful in explaining the concept of the present invention.
Figure 9:
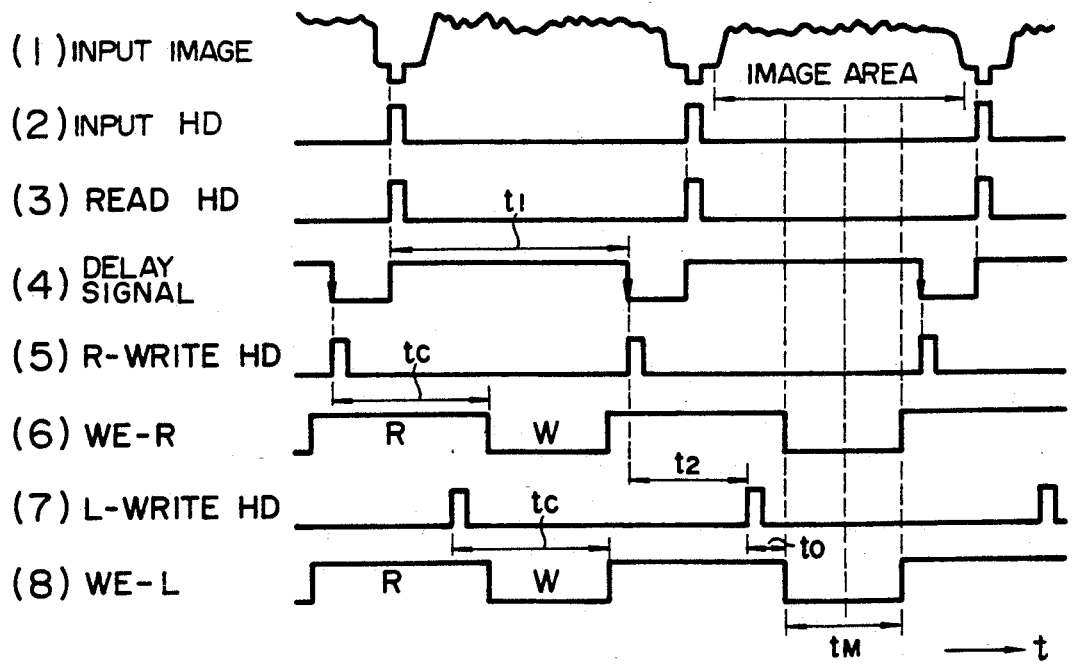
FIG. 9 shows waveforms produced at various components of the invention.

The operation will be explained now with reference to FIGS. 8 and 9. The explanation will be made about the case in which images of different objects are stored in the right and left parts as shown in FIG. 2(b) and printed.

First, the object 1 (boy Taro) is photographed at the center of the camera view in the manner shown in FIG. 8(a). The image is written in the memory means 10 under this condition. The stored image checked by the monitor 15 is arranged automatically in, say, the left half part (L) in the manner shown in FIG. 8(b). The HD signal from the HD signal processing means 24 is generated at the position specified in FIG. 9(7) in such a manner that the center of the WE signal (WE-L) of FIG. 9(8) substantially coincides with the center of the image area of the video signal (FIG. 9(1)). In the process, both the address control means 12 and the W/R control means 11 for driving the memory means 10 operate from the HD signal applied to the memory control means 13 (the signal of FIG. 9(7) in this case) as a reference signal. As a result, the WE signal (FIG. 9(8)) from the W/R control means 11 becomes "L" level at the time $t_0$ after generation of the L-Write HD signal of FIG. 9(7), so that the video signal (FIG. 9(1)) is applied to the left half part of the memory 10 in the same timing. That is to say, an image representing a half of the whole image almost at the central part of the image area is written in the left half part of the memory means 10. (FIG. 8(b)).

The system controller 22 is then operated to switch the write area of the memory means 10 to the right half (R) while at the same time changing the object (to, say, girl Hanako). In the process, the position of the object or the camera angle is not changed consciously but the object appears at substantially the central part in camera view. Under this condition, the image is written in the memory means 10, and as shown in FIG. 8(d), the central part of the image of the new object (Hanako) is stored in the right half part. In the process, the R-Write HD signal from the HD signal processing means 24 is produced in such a way that the center of the W period of the WE-R signal (FIG. 9(6)) coincides substantially with the center of the image area as shown in FIG. 9(5). With regard to the relative timings in FIG. 9, the period $t_0$ from the L-Write HD signal to the fall of the WE-L coincides with the period from HD of the input image to the point immediately after start of the image area and is determined at the time of system design. The period $t_M$ when the WE signal is at the "L" level, on the other hand, is one half the memory period of 1H. When 512 dots in horizontal direction are stored in sampling cycles of $t_{CK}$, for instance, $t_M = 256\ t_{CK}$. The leading edge of the WE-R signal and the trailing edge of the WE-L signal have the same timing $t_C$ from the HD signal respectively. In other words, the relationship $t_C = t_0 + t_M$ holds. As a result, $t_2 = t_M = 256 t_{CK}$. During this period $t_2$, the sampling clocks CK are counted and generated, as described later. Also, the period $t_1$ between the input HD signal (FIG. 9(2)) and the R-Write HD signal (FIG. 9(5)) is adjusted by the delay means 105. The delay means 105 may alternatively be adjusted by the system controller 22 or the personal computer 7.

Figure 10:
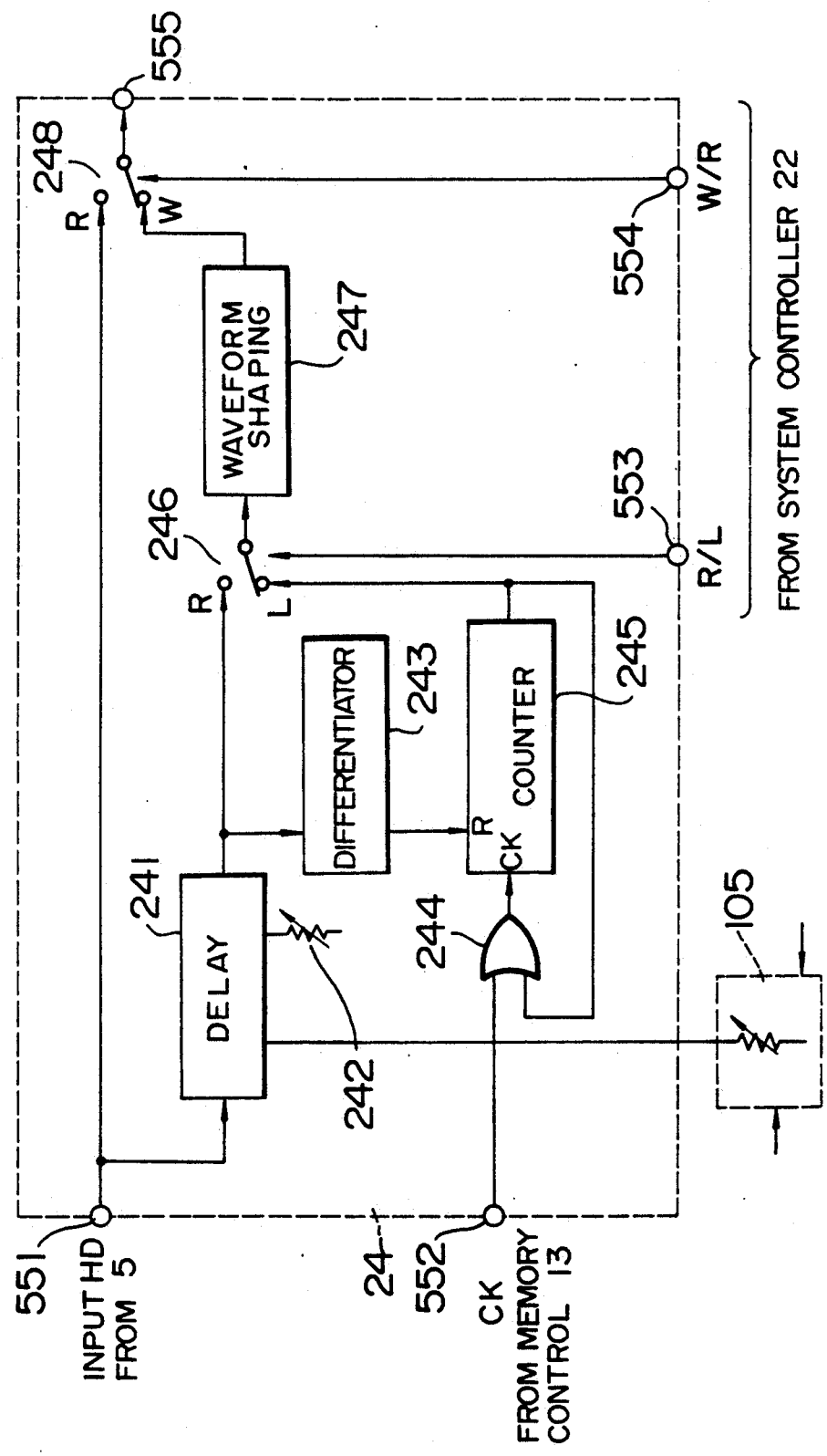
FIG. 10 is a block diagram of HD signal processing means in FIG. 7 according to an embodiment of the invention.

Now, an embodiment of the HD signal processing means 24 is shown in FIG. 10. (The waveforms produced at the various components are identical to those in FIG. 9). In FIG. 10, numeral 241 designates delay means, numeral 242 adjust means, numeral 243 a differentiation circuit, numeral 244 a clock gate, numeral 245 a clock counter, numeral 246 an R/L selector, numeral 247 a waveform shaping circuit, and numeral 248 an HD selector.

The operation of this circuit will be explained. The delay means 241 is triggered by the input HD to produce a delay signal (FIG. 9(4)) which falls after the lapse of the period $t_1$ determined by a time constant of the adjust means 242 or the like. This delay signal is applied to the R contact (Right) of the R/L selector 246 on the one hand and to the differentiation circuit 243 on the other. The differentiation circuit 243 shapes by differentiation of the trailing edge of the delay signal to produce a reset pulse like the clock pulse CK. This reset pulse is applied to the reset terminal R of the clock counter 245 to reset the counter 245. At the same time, the counter output becomes "L" in level. As a result, the clock gate 244, an OR gate, supplies an input clock CK to the clock terminal CK of the counter 245, thereby causing the clock counter 245 to start counting. With the progress of clock pulses CK to a determined number (a number corresponding to $t_2$ in FIG., 9), say, to 256 as mentioned above, the output of counter 245 is reversed to the "H" level. At the same time, the clock gate 244 is closed, and the counter 245 stops with the count held therein. Upon resumption of supply of a reset signal from the differentiation circuit 243, exactly the same counting is started again.

The counter output and the delay signal are applied to the HD selector 246 and switched by the R/L selection signal from the system controller 22. The signal thus selected is applied to the waveform shaping circuit 247 in and is shaped into a pulse (write HD) of the same width as the input HD signal. This write HD signal the input HD signal is selected by the HD selector 248, so that the write HD signal is selectively produced by connection of selector 248 to the contact W at the time of write (W) in the memory means 10, and the input HD is produced as a read HD signal by connection of selector 248 to the contact R at the time of read (R).

Figure 11:
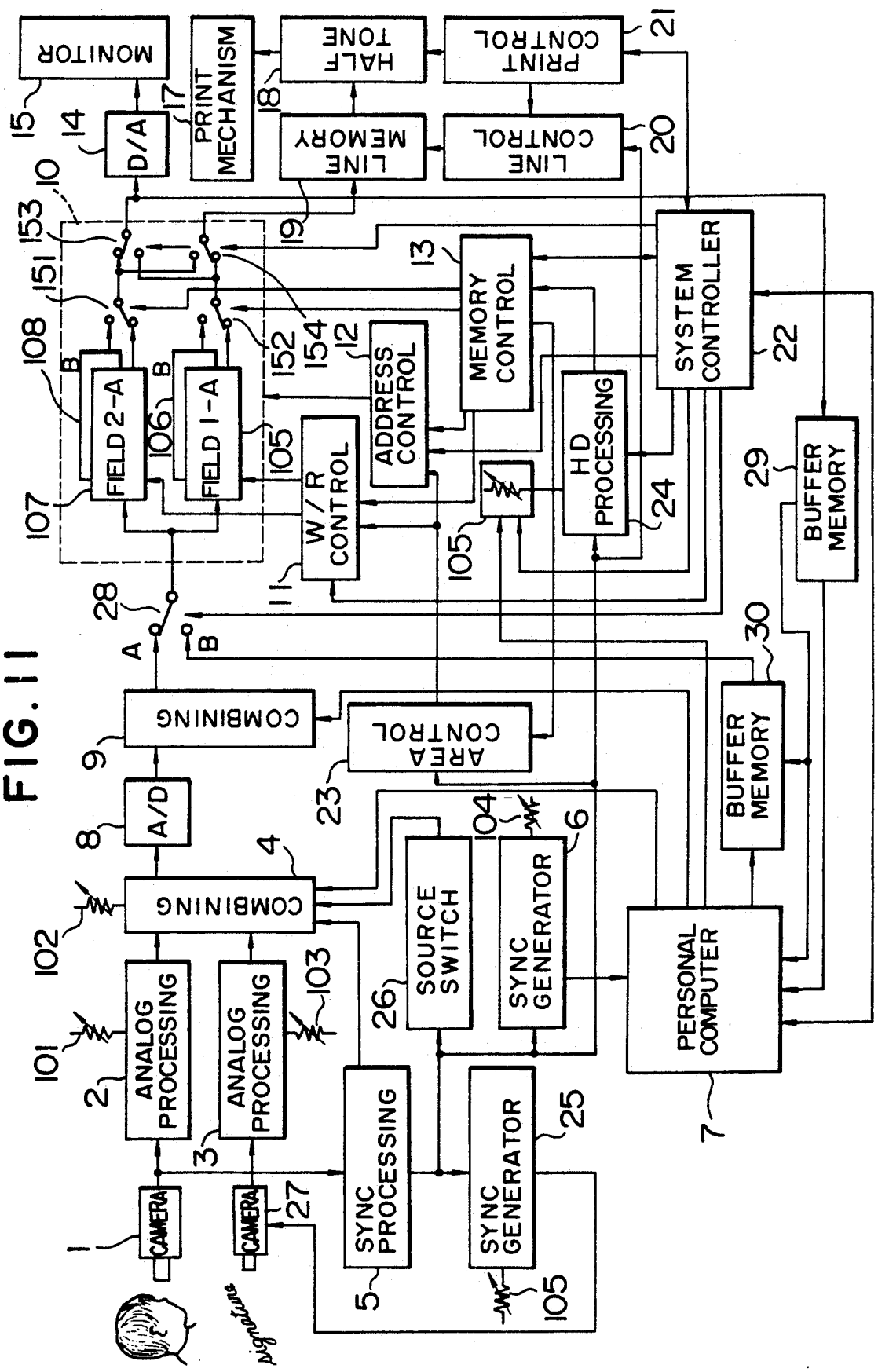
FIG. 11 is a block diagram showing a further embodiment of the present invention.

Still another embodiment of the present invention is shown in FIG. 11. In FIG. 11, the component parts having the same functions as the corresponding parts in FIG. 7 are designated with the same reference numerals respectively. In FIG. 11, numeral 3 designates analog processing means, numeral 25 sync signal generation means, numeral 26 source switching signal generation means, numeral 27 a second signal source such as video camera, numeral 28 a video data selector, and 29, 30 buffer memories. The memory means 10 includes field memories 105, 106 and 107, 108, field data selectors 151, 152, and frame data selectors 153, 154.

The operation of this circuit will be explained. The analog processing means 3, 2 and the adjusting means 103 operate the same way as the analog processing means 2 and the adjusting means 101 in FIG. 7 respectively. The sync signal generation means 25 and the adjusting means 105, on the other hand, operate the same way as the sync signal generation means 6 and the adjusting means 104 in FIG. 7 respectively. In other words, the vertical and horizontal phases of the signal from source 27 in comparison with the signal from source 1 are adjusted by the sync signal generation means 25 and the adjusting means 105. On the other hand, the buffer memory 29 covers one line, one color or one field and is adapted to write the video data lead from the memory means 10 in the buffer memory 29 in real time. After that, the data in the buffer memory 29 is read at low speed by means of the personal computer 7, and while being replaced, is written in the buffer memory 30 at low speed. Upon completion of the write process, into the buffer memory 30, the data is written in real time in the original field memory through the data selector 28. If data is read out of the field 1-A memory 105 and written in the buffer memory 29, it is written again in the field 1-A memory 105. The field data selectors 151, 152 are controlled by the area control means 23 or the memory control means 13. The frame data selectors 153, 154, on the other hand, are controlled by the system controller 22 thereby to select opposite frame memories respectively. In the case where the frame data selector 153 selects the output of the frame memory 2 (field memories 107 and 108), for example, the frame data selector 154 selects the output of the frame memory 1 (field memories 105 and 106). Also, the buffer memory 29 and the D/A converter means 14 are always supplied with the same frame data. In other words, the output of a frame memory being rewritten by the personal computer 7 is displayed on the monitor 15.

In this way, with the memory means 10 having two sets of frame memories (105, 106 and 107, 108), the data stored in the frame memory 1 (105 and 106) may be printed by the print mechanism means 17, while video, character and symbol data from the signal sources 1, 27 and the personal computer 7 may be written in the frame memory 2 (107, 108) through the video data selector 28. Further, by use of the buffer memories 29, 30, the data in the frame memory 2 (field memories 107 and 108) is read out, and a part of that data is rewritten in the same frame memory 2 through the video data selector 28. Upon completion of printing the frame memory 1 with the frame memory 2 being written, the frame data selectors 153 and 154 are switched to the opposite side to print the data from the frame memory 2, while at the same time writing a new video signal from the digital combination means 9 into the frame memory 1. After that, a part of the data in the frame memory 1 is rewritten in similar manner.

Although the buffer memories 29 and 30 are used independently of each other in the aforementioned configuration, a common buffer memory may alternatively be used to attain the same configuration and operation.

Figure 12:
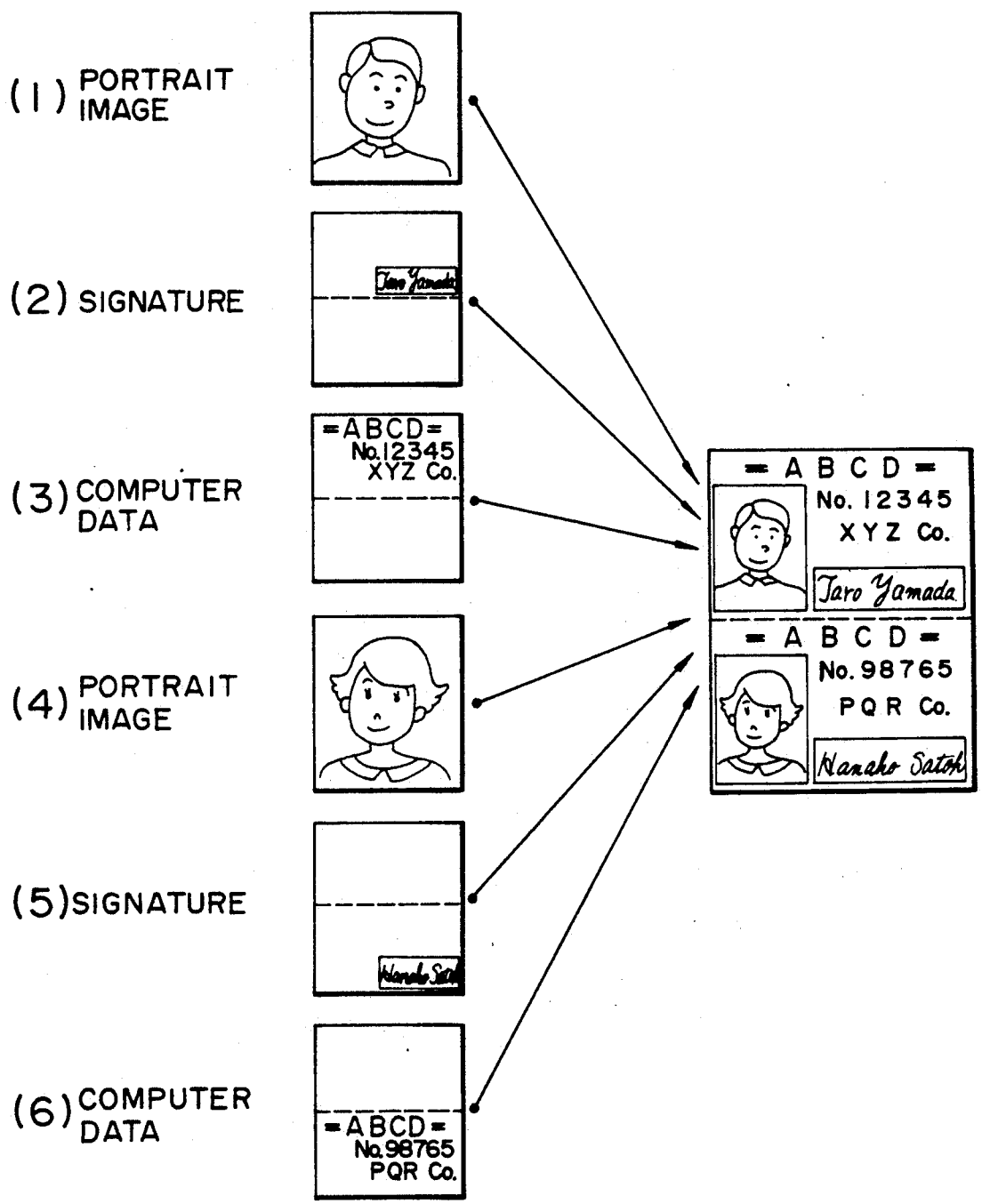
FIG. 12 is a diagram useful in explaining the concept of operation with respect to a print divided into two parts.

In the embodiment shown in FIG. 11, the operation for producing a double-segmented print as shown in FIG. 12 will be explained. First, for independent memory operation for the two divided parts, as in the embodiment of FIG. 4, data are independently written in the right and left areas by the area control means 23, W/R control means 11 and the address control means 12. First, refer to the image in the upper part in FIG. 12. The portrait image from the image signal source 1 and the signature image from the image signal source 27 are combined by the analog combination means 4. Further, the combined image is converted into a digital image by the A/D converter means 8, and the result is combined with the data from the personal computer 7 by the digital combination means 9 as required. The resulting combined digital image is stored in the memory means 10 through the video data selector 28. The stored image under this condition is such as shown in FIG. 13(a) or (b), for example. Specifically, it is a combination a portrait image and a signature image or a combination a portrait image, a signature image and a part of the data from the personal computer (especially a fixed part of personal computer data). After that, the stored image is read out, and with the required data added thereto by the buffer memories 29, 30 and the personal computer 7, is written again in the same field memories 105, 106 or 107, 108 through the video data selector 28.

Upon completion of the upper part of the image shown in FIG. 12, the area control means 23 becomes ready to write the lower part of the image. The next portrait and signature are thus prepared, and their images are combined in a similar manner and stored in memory. Further, the data from the computer is combined by use of the buffer memories 29, 30. Then the image in the buffer memory 30 is written again in the same field memories 105, 106 or 107, 108 through the video data selector 28. When a frame of image (upper and lower images of FIG. 12) is complete in this way, the frame data selectors 153, 154 are turned to the opposite side in the manner mentioned above thereby to start printing.

Although the foregoing description relates to the combination of portrait image and a signature image by the analog combination means 4, the invention is not limited to such method. Alternatively, first, a portrait image is converted into a digital image by the A/D converter means 8, and written temporarily in the memory means 10 in a form one half smaller in scale. Immediately after this process, the signature image or a combination of the signature image and a part of the computer data is combined with the portrait image in the memory means 10, thus producing an image as shown in FIG. 13. An embodiment of this image reduction will be explained below by reference to a common case (reduction to $\frac{1}{2}^n$ in size).

Explanation will be made about another embodiment of the present invention will reference to FIG. 14. In FIG. 14, numeral 51 designates a signal source such as a magnetic recording and reproduction apparatus, a video camera or a television broadcast receiver, numeral 52 is a decode processing means for analog signal processing, numeral 53 is memory means such as a frame memory, numeral 54 is encode processing means, numeral 55 is a monitor, numeral 56 is printing means for making a hard copy of the data stored in the memory means 3, and numeral 57 is a system controller.

Figure 16:
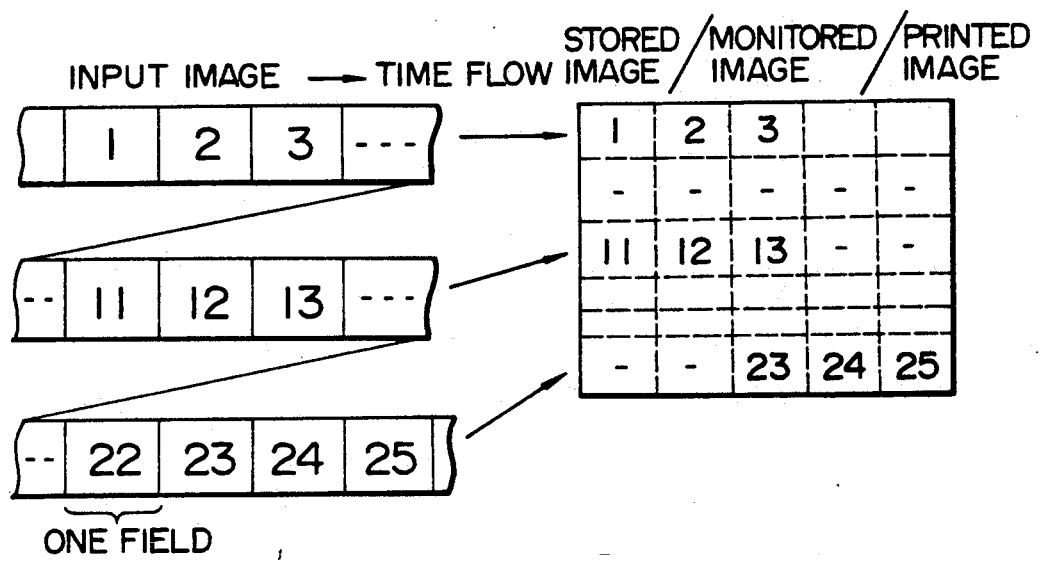
Figure 17:
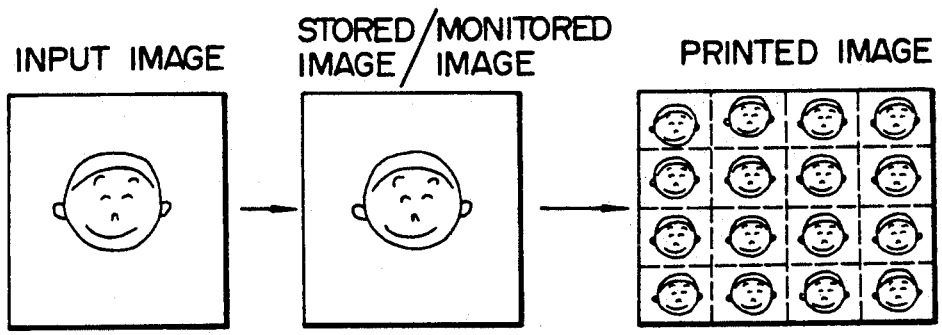
Figure 18:
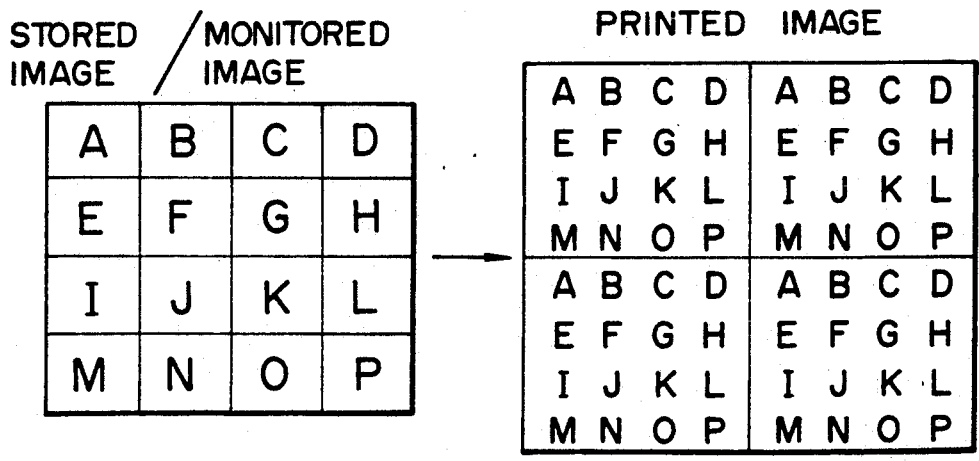

Now, the operation of this circuit will be explained. This system is such that a video signal from the signal source is sequentially reduced in scale and held in multiple form at the memory means 53, which are printed by the printing means 56 after being confirmed by the monitor 55 in a first mode (FIG. 15). In a second mode, if the signal source 15 is made up of a magnetic recording and reproduction apparatus such as VTR or a video floppy disk, the signal source 51 is interlocked operatively with the system controller 57, so that the data in the video floppy disk (such as a 50-field image) is sequentially reduced and held in the form of 25 images per field, that is, as a multi-image data, after which it is printed (FIG. 16). Further, in a third mode, a video signal from the signal source 51 is held in the memory means 53 in the same standard size without being reduced, and a multiple-segmented image as shown in FIG. 17 is printed by the printing means 56 (An image is reduced to 1/N in size, for example, and a number N of the same images are arranged in a single print). Furthermore, as a fourth mode, the multiple-screen image shown in FIG. 15 or 16, held in reduced form in the memory 53, is further reduced in size in the manner shown in FIG. 17, and a print shown in FIG. 18 is produced.

Figure 19:
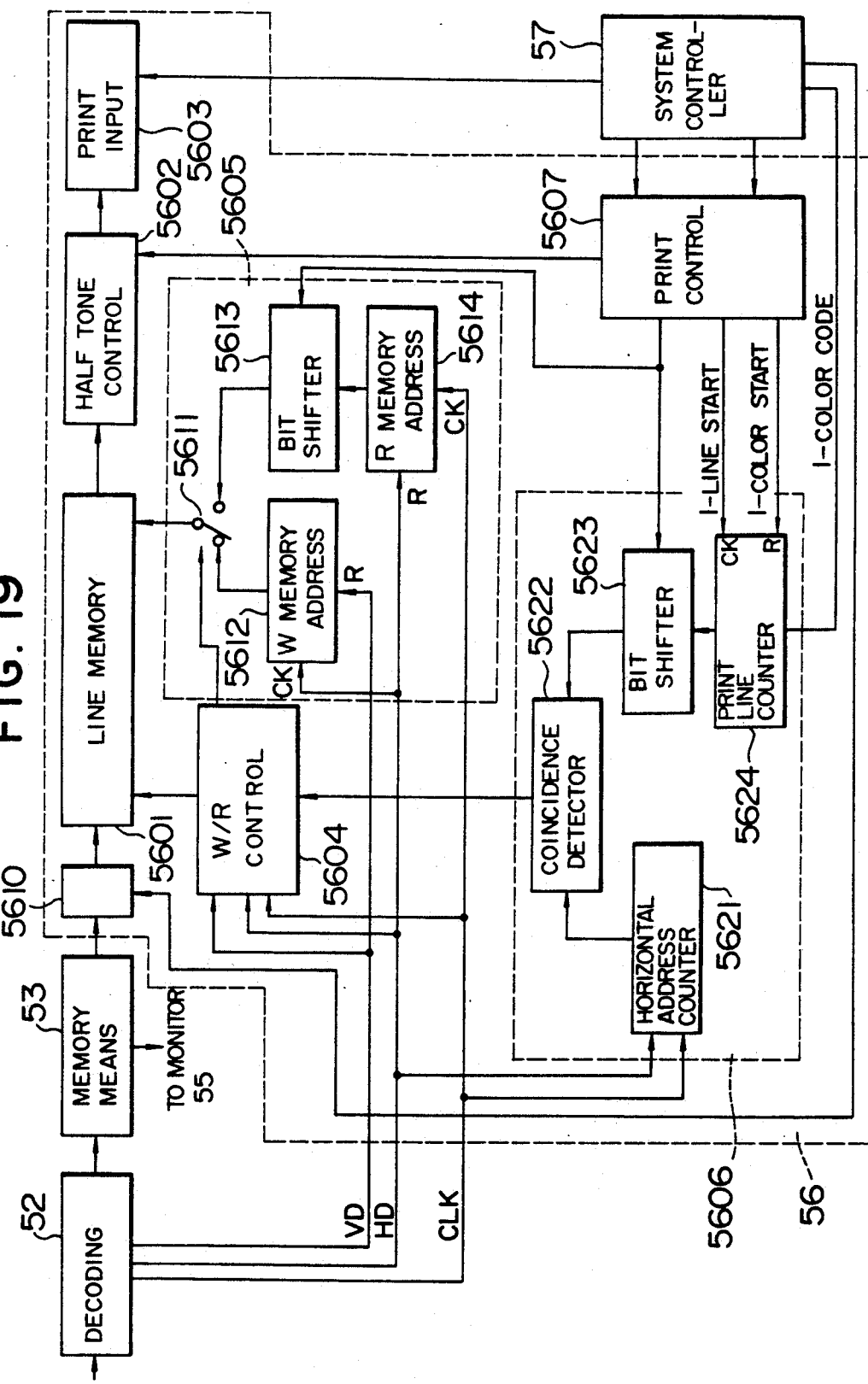
FIG. 19 is a block diagram showing still another embodiment of the present invention.

Another embodiment of the present invention is shown in FIG. 19. This embodiment is intended to permit operation in the third mode set forth in the of FIG. 14. In FIG. 19, the printing means 56 includes a line memory 5601, half tone control means 5602, printing mechanism means 5603, write/read (W/R) control means 5604, memory address control means 5605, horizontal address control means 5606, print control means 5607 and a signal selector 5610. The memory address control means 5605, in turn, includes an address selector 5611, write (W) memory address means 5612, a bit shifter 5613, and read (R) memory address means 5614.

The horizontal address control means 5606 includes a horizontal address counter 5621, coincidence detection means 5622, a bit shifter 5623 and a print line counter 5624.

Figure 20:
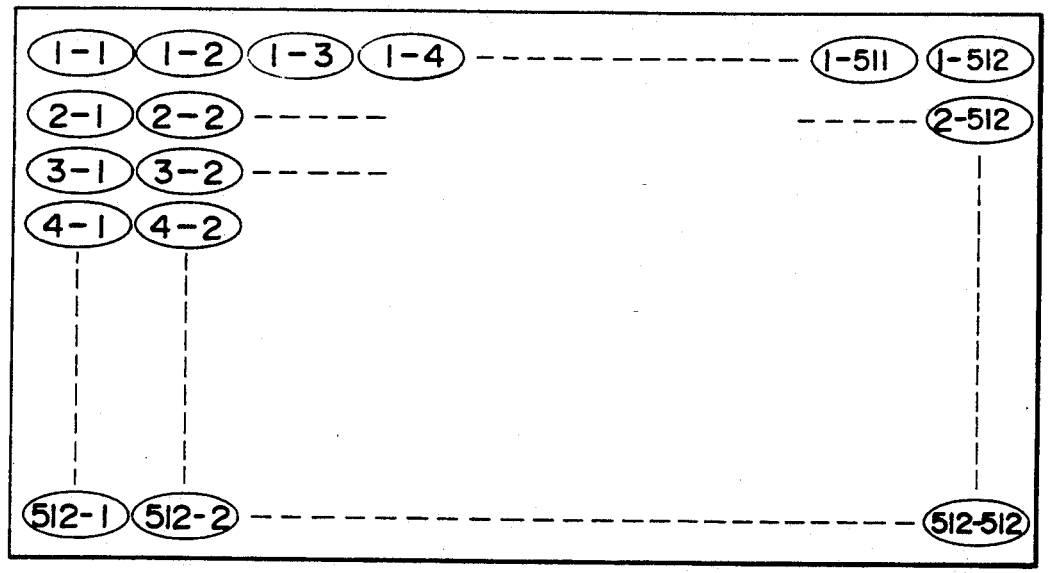
FIG. 20 is a schematic diagram useful in explaining the operation of the embodiment of FIG. 19.

Now, the operation of this system will be explained with reference to FIG. 20. First, reference is made to the case of printing a stored image directly in standard form. At the time of printing, color signals are selected by the signal selector 5610 from the signals representing the three primary colors from the memory means 53 and are printed in sequence. Colors are selected in compliance with the designation of the system controller 57. Each color is printed in exactly the same way, and therefore the printing operation will be explained below with reference to a single color as a typical case.

First, an image is on display constantly on the monitor 55 from the memory means 53. The addresses of the images stored in the memory means 53 are determined in the manner shown in FIG. 20. Pixels are read on the monitor 55 sequentially along lateral direction from 1-1 to 1-2, 1-3, ... 1-511, 1-512/2-1, 2-2, 2-3, ..., 2-512/3-1, 3-2, ... 3-512/ ... 512-1, 512-2, ..., 512/512. Pixels are thus read sequentially along the same direction as the scanning on the monitor.

The printing means 56, on the other hand, holds data in the line memory 5601 for each line, and after the data is printed by the print mechanism means 5603 through the half tone control means 5602, the data for the next line is held in the line memory 5601. The line memory 5601 holds data for each line along the longitudinal direction, for example, for each line of 1-1, 2-1, 3-1, ... , 512-1, which data is then printed. After that, the line memory 5601 holds data on the second line, third line and so on, until the printing process is finished for one color at the 512th line. The other two colors are then printed to complete a sheet of print.

In the process, the bit shifters 5613 and 5623 supply the address bit of the R memory address means 5614 and the print line counter 5624 to the next stage without any bit shift. The line to be selected (one line along longitudinal direction) is selected by the horizontal address control means 5606. Specifically, the number of the longitudinal line to be printed next is counted by the print line counter 5624. In other words, the print line counter 5624 is reset by a single-color start signal from the print control means 5607, after which the one-line start signal applied for each line print is counted to select the number of print lines. The horizontal position in FIG. 20, on the other hand, is counted by the horizontal address counter 5621. Specifically, in response to a horizontal sync (HD) signal from the decode processing means 52, the horizontal address counter 5621 is reset, and the clock signal CLK is counted to determine the horizontal position. The count data in the horizontal address counter 5621 and the print line counter 5624 are compared with each other in the coincidence detector means 5622, and when the count in the horizontal address counter 5621 coincides with the horizontal position to be printed (the count in the print line counter 5624), a coincidence signal is applied to the W/R control means 5604. The W/R control means 5604, in turn, write the data from the memory means 53 pixel by pixel into the line memory 5601 in response to the coincidence signal. The address along the longitudinal (vertical) direction is controlled by the W memory address means 5612. In other words, the W/R control means 5604 is reset by the vertical sync (VD) signal from the decode processing means 52, and the HD signal is counted to control the vertical address.

Now, in order to produce a print of FIG. 17, the reduction and repetitive printing along the vertical direction and the reduction and repetitive printing along the horizontal direction are accomplished. First, referring to the printing along the vertical direction, data is written in the line memory 5601 on 1-1, 2-1, 3-1, ..., 512-1 in that order in a manner similar to normal printing. When reading the line memory 5601, the bit shifter 5613 is actuated. In the case of segmenting the screen into 16 parts as shown in FIG. 17, for instance, data as many as one fourth, say, 128 data are read out at intervals thinned out along the vertical direction, followed by the same 128 data being read three times repetitively, thereby producing a total of 512 vertical data. First, in order to read the vertical data, that is, the data in the line memory 5601 as curtailed to one fourth, the address data $A_O$ in the R memory address means 5614 is shifted by two bits to produce an output address $A_b = 4 A_c$ from the bit shifter 5613. As a result, with each increase from $A_O = 0$ one by one, $A_b$ increases by four, so that data thinned out to one fourth is read out, and the final address $A_b = 508$ is reached at $A_O = 127$. After that, the R memory address means 5614 continues to produce an R address, and the output address $A_b$ of the bit shifter 5613 increases from 0 each time by four until it reaches 508. This process is repeated three times. Now, the relationship between the outputs of the R memory address means 5614 and the bit shifter 5613 is shown below.

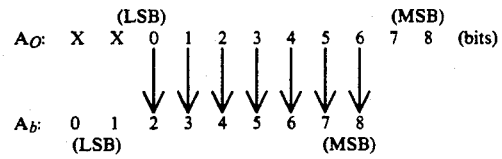

In this way, the outputs are shifted by two bits. The data of 0 and 1 bit of $A_b$ are fixed to "0" (or "1") respectively.

The above-mentioned case of thinning out to one fourth is also applicable to other thin-out rates. In thinning out to $\frac{1}{2^n}$, for instance, n bits are shifted to obtain the relationship $A_i = 2^n \cdot A_0$, whereby data compressed to $\frac{1}{2^n}$ vertically is printed a number $2^n$ of times.

The reduction and repetitive prints in the horizontal direction will not be explained. If the screen is to be divided into 16 parts as shown in FIG. 17, for example, an image one fourth in horizontal length is produced by thinning out to one fourth in the horizontal direction. This process is repeated four times for printing. The vertical lines, printed in this case include lines 1, 5, 9, . . . , 509, for example, in FIG. 20, so that 128 vertical lines are designated and stored in the line memory 5601. These operations are controlled by the horizontal address control means 5606. Specifically, the designation of the vertical lines stored in the line memory 5601 is effected by the bit shifter 5623. The output $N_0$ of the print line counter 5624 is shifted by two bits with the result that the address $N_i$ of the bit shifter 5623 applied to the coincidence detector means 5622 is given as $N_i = 4 N_0$. In a manner similar to the memory address control means 5605, the horizontal address is given as $N_i = 1, 5, 9, \ldots, 509$ to take 128 vertical lines sequentially into the line memory 5601. The bit relationship held in this case is as shown below as in the case of the bit shifter 5613.

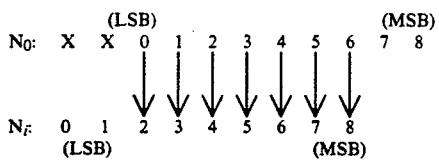

Under this condition, the last 2 bits of the bit shifter 5623 are fixed to "0" or "1". Also, while the print line counter 5624 counts 512, the bit shifter 5623 repeats the same count (1, 5, 9, ..., 509) four times.

In the case of thinning out by $\frac{1}{2^n}$ in general, a solution is to shift by n bits to attain the relations $N_i = 2^n \cdot N_0$. As a result, $2^n$ lines, compressed to $\frac{1}{2^n}$ in horizontal direction, are printed.

Figure 21:
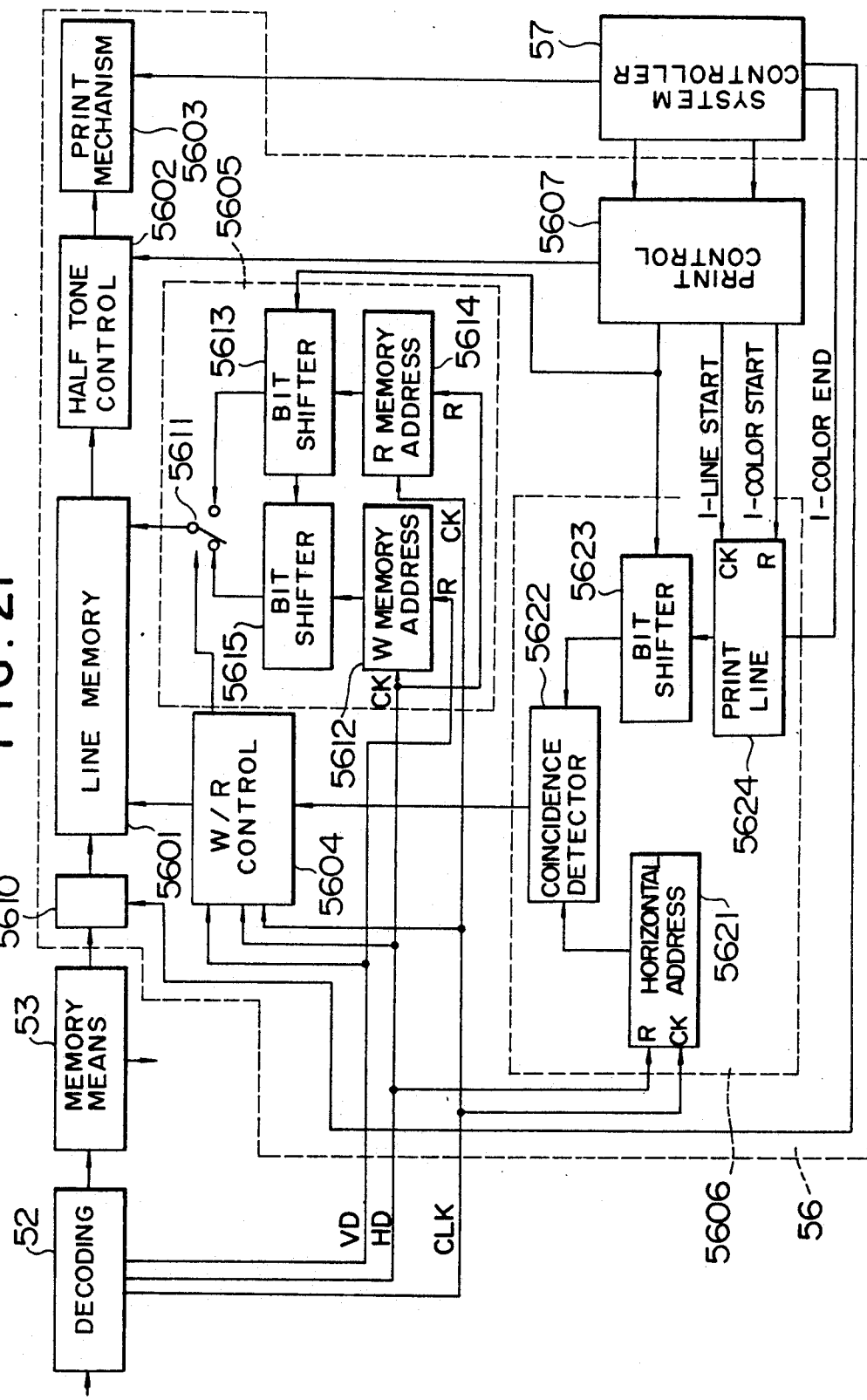
FIG. 21 is a block diagram showing still another embodiment of the present invention.

Another embodiment for printing as shown in FIG. 17 is illustrated in FIG. 21. In FIG. 21, those component parts having the same functions as corresponding parts in FIG. 19 are designated by like reference numerals, respectively. In FIG. 21, the memory address control means 5605 includes an address selector 5611, W memory address means 5612, a bit shifter 5613, R memory address means 5614 and a bit shifter 5615.

Now, the operation of this circuit will be explained. In this embodiment, thinned-out vertical data are written in the line memory 5601 and repeatedly read out. First, the data is written in the line memory 5601 by the W memory address means 5612 and the bit shifter 5615. More specifically, the address $A_{WO}$ from the W memory address means 5612 corresponds to the address of the input data, while at the same time being shifted by the bit shifter 5615 to become an address $A_{WI}$ for the memory. In the process, the address $A_{WO}$ is shifted by one bit to hold the relationship $A_{WO} = 2 \cdot A_{WI}$. The direction of shifting in this case is opposite to that of the bit shifter 5613. The relationship of addresses for writing is set in the manner described below.

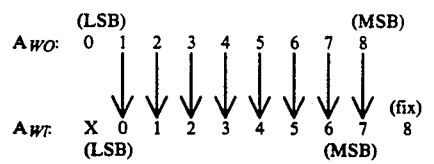

Figure 22:
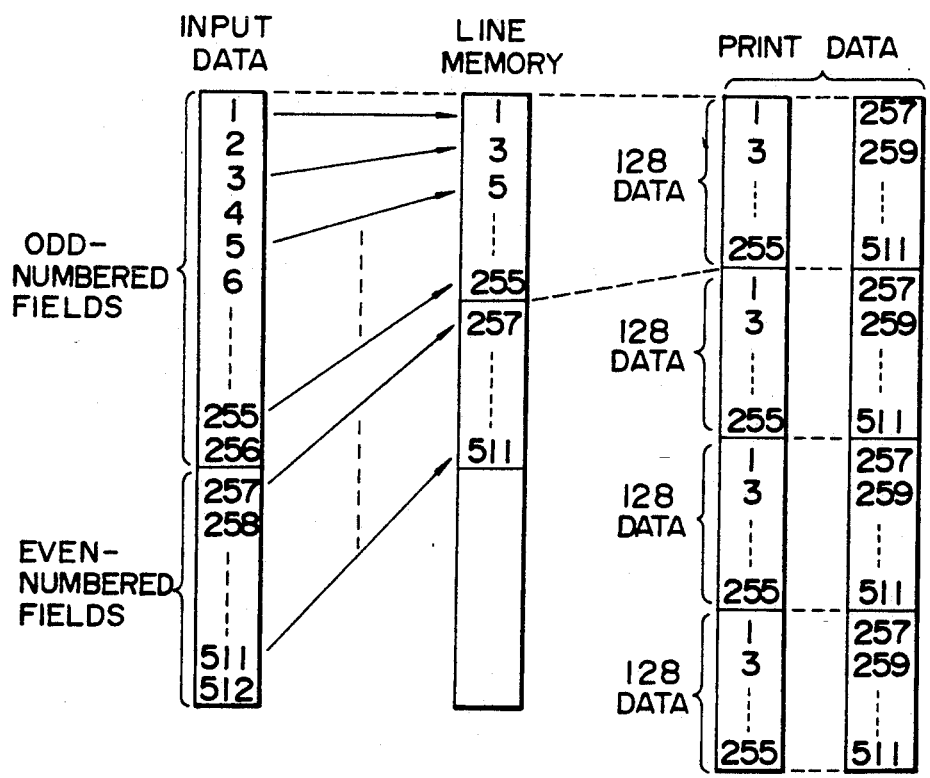
FIG. 22 is a schematic diagram useful in explaining the operation of the embodiment of FIG. 21.

Under this condition, the vertical data takes the forms shown in FIG. 22 for input, line memory and print. The data stored in the line memory 5601 are thus given as 256 data including 1, 3, 5, ..., 255, 257, ..., 511 (8 bits). Of all these data, the 128 data from 1 to 255 are written from odd-numbered field images, and the 128 data from 257 to 511 are written from even-numbered field images.

The data in the line memory 5601 is controlled by the R memory address means 5614 and the bit shifter at the time of printing. In the process, the relationship between the output $A_{RO}$ of the R memory address means 5614 and the output $A_{RI}$ of the bit shifter is set as shown below.

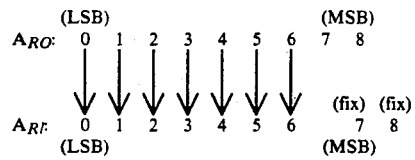

In other words, the most significant bit (MSB) of the R memory address supplied to the address selector is made the same as the MSB bit of the write address $A_{WI}$. Also, the second significant bit is fixed to "0" or "1". In this case, if the second bit is fixed to "0", the odd-numbered field data in FIG. 22 are read, while if it is "1", the even-numbered field data are read out. Since the most significant two bits are fixed, either odd- or even-numbered field data (128 data) are repeatedly read four times and printed by the half tone control means 5602 and the print mechanism means 5603.

The bit shifters 5613 and 5615 are controlled by the system controller 57 through the print control means 5607.

Figure 23:
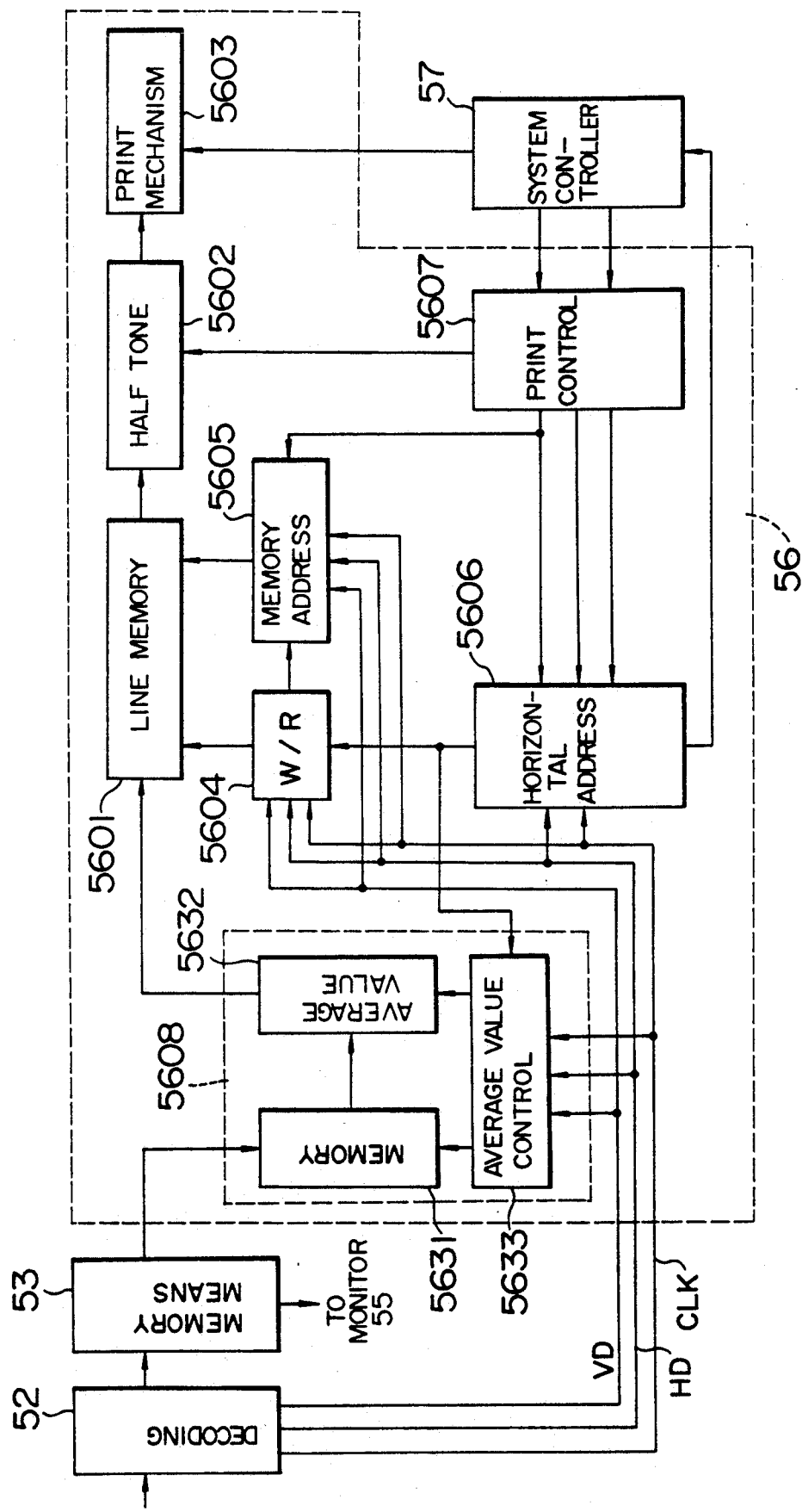
FIG. 23 is a block diagram showing a still further embodiment of the present invention.

Now, still another embodiment for realizing a print of FIG. 17 is shown in FIG. 23. In FIG. 23, those component parts having the same functions as the corresponding parts in FIG. 19 are designated by the same reference numerals respectively as in FIG. 19. In FIG. 23, numeral 5608 designates average value means including a buffer memory 5631, an average value circuit 5632 and an average value control means 5633. In this embodiment, the average value means 5608 is inserted before the line memory 5601. As an alternative arrangement, however, the average value means 5608 may be disposed after the line memory 5601, or data may be read from the line memory 5601, and after being averaged may be rewritten into the line memory 5601.

Now, the operation of this circuit will be explained. The parts of the circuit other than the average value means 5608 function in a manner similar to those in FIG. 19 or 21. Data on the vertical line to be printed is supplied at the rate of one data for each horizontal sync period as input data to the line memory 5601. In the case where the first line is to be printed in FIG. 20, for instance, the line memory 5601 is supplied with averaged data in a timing corresponding to 1-1, and then 512 data along the horizontal direction, followed by a number 512 of the next successive averaged data in a similar manner in a timing corresponding to 1-1. Subsequently, data is applied successively at the rate of one data for each horizontal period in a timing corresponding to 3-1, 4-1, ..., 512-1 along vertical direction in similar fashion.

A method of averaging by the average value means 5608 along vertical or horizontal direction or from data in four directions in what is called a four-direction averaging method is well known. An embodiment for providing a four-direction average will be explained below as an example. The explanation will be made with reference to FIG. 24 which is divided into 16 parts as for the systems in FIGS. 19 and 21. First, the data on a vertical line of an address to be written in the line memory 5601 or a vertical line to be printed (hereinafter called "the vertical line to be stored") and the immediately preceding or following (laterally in FIG. 20) three rows of vertical lines are stored in the buffer memory 5631 from the data sequentially supplied in real time from the memory means 53 in the manner shown in FIG. 20.

More specifically, as shown in FIG. 24(a), four successive data (n, m−3), (n, m−2), (n, m−1) and (n,m) are stored in the buffer memory 5631 during one horizontal period for the n-th line. During the horizontal period for the next (n+1)th line, the data in each memory is shifted upward as shown in FIG. 24(b) thereby to write the data on the (m−3)th to m-th rows on the (n+1)th line anew. Data are subsequently written sequentially, and the data shown in FIG. 24 are stored in the buffer memory 5631. All these data (16 data in the embodiment under consideration) are averaged out at the averaging circuit 5632. Under the condition attained as shown in FIG. 24(a), the average value output $D_A$ (n, m) is expressed as $$D_A(n, m) = \frac{1}{16} \sum_{i,j=0}^{3} D(n-i, m-j)$$

providing average value data simply obtained as a four-direction average (average value of 16 (=4×4) units). This data $D_A$(n, m) is written during the next horizontal period as a new data (n+4, m), and at the same time or before that, it is written at the address n of the line memory 5601 (in the case of FIG. 19) (In the case of FIG. 21, every other data is written). In this way, the average value data of the vertical lines to be stored in the line memory 5601 are sequentially sent out and written in the manner shown in FIG. 19 or 21.

In the foregoing case, an effective value is obtained by averaging in four directions the vertical data of n=1 to 253 and 257 to 509 associated with the vertical lines of m=1 to 509 in the horizontal direction. In the case of calculating the average value data for the other positions near the print area, however, data on the address satisfying the condition m>512 is required but is not actually available. In the case where the four-direction average value of n=254, 255, 256 and n=510, 511, 512 in the vertical address, the data of n=257, for instance, cannot be used as it has a different field as shown in FIG. 22. Under such a condition, the fixed data or black or white is applied to the buffer memory 5631 for obtaining a four-direction average value.

Also, the method of producing an average is not necessarily limited to the one described above for division into 16 parts in which 16 data are averaged. Instead, four data (for instance, (n, m), (n, m−3), (n−3, m−3), (n−3, m) or (n, m), (n, m−2), (n−2, m−2) and (n−2, m) in FIG. 24(a) may be used.

Figure 25:
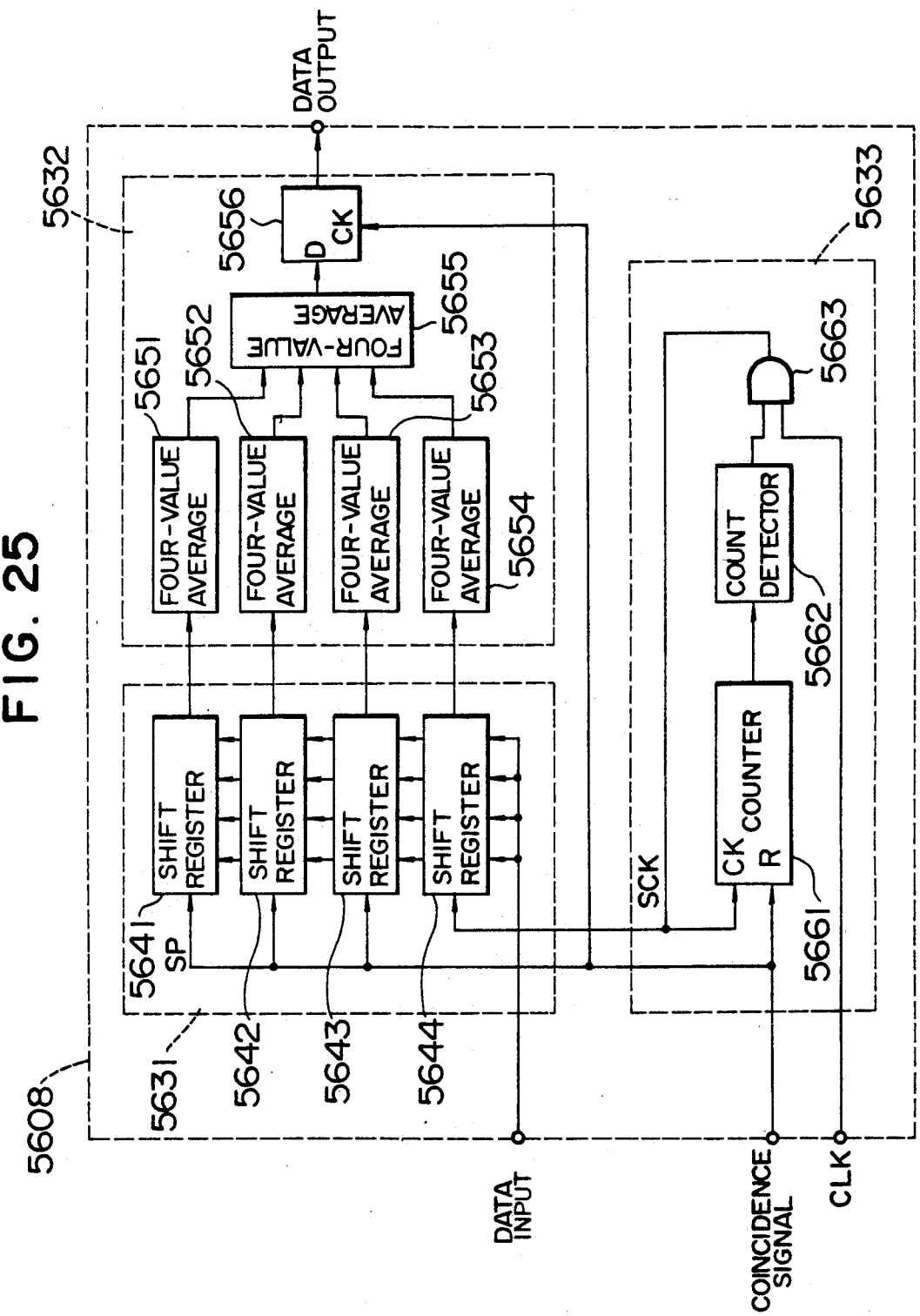
FIG. 25 is a block diagram showing an example of average value means in FIG. 23 according to the present invention.

Now an embodiment of the average value means 5608 shown in FIG. 23 will be explained with reference to FIG. 25. In FIG. 25, the buffer memory 5631 includes four shift registers 5641 to 5644, and the average value circuit 5632 includes four averaging circuits 5651 to 5654, and output averaging circuit 5655 and an output latch 5656. The average value control means 5633 includes a clock counter 5661, a count value detector 5662 and a clock gate 5663.

Now, the operation of this embodiment will be explained. First, the shift registers 5641 to 5644 in the buffer memory 5631 operate to store data sequentially in the manner shown in FIG. 24. In the process, the data in each shift register is shifted at the same time by a shift pulse SP. Immediately after that, four input data are sequentially applied to the shift register 5644. This operation of retrieval is effected by a shift clock SCK from the average value control means 5633.

The 16 data from the buffer memory 5631 are supplied to the average value circuit 5632. First, an average value of each the four shift registers 5641 to 5644 is taken by the four averaging circuits 5641 to 5654 respectively, and the respective outputs are averaged again at the averaging circuit 5655. The equation below is thus obtained.

$$D(m, n) = \frac{1}{4} \sum_{j=0}^{3} \left( \frac{1}{4} \sum_{i=0}^{3} D(n-i, m-j) \right)$$
$$= \frac{1}{16} \sum_{i,j=0}^{3} D(n-i, m-j)$$

This four-direction average data D (m, n) is applied to the output latch 5656 by the next-arriving shift pulse SP.

In the average value, control means 5633, on the other hand, the coincidental signal is reset by the clock counter 5661 so that the count value detector 5662 reverses the output thereof, to "H". As a consequence, the clock gate 5663 applies an input clock CLK to the shift register 5644 and the clock counter 5661. In this embodiment, when the clock counter 5661 counts four SCK pulses, the count value detector 5662 reverses the output thereof to "L" thereby to close the clock gate 5633. As a result, four data are newly applied to the shift register 5644 after arrival of a coincidence signal.

The average value means 5608, by supplying averaged data instead of a single-point data to be held for image reduction, smooths the lines and profile of the reduced image.

Figure 26:
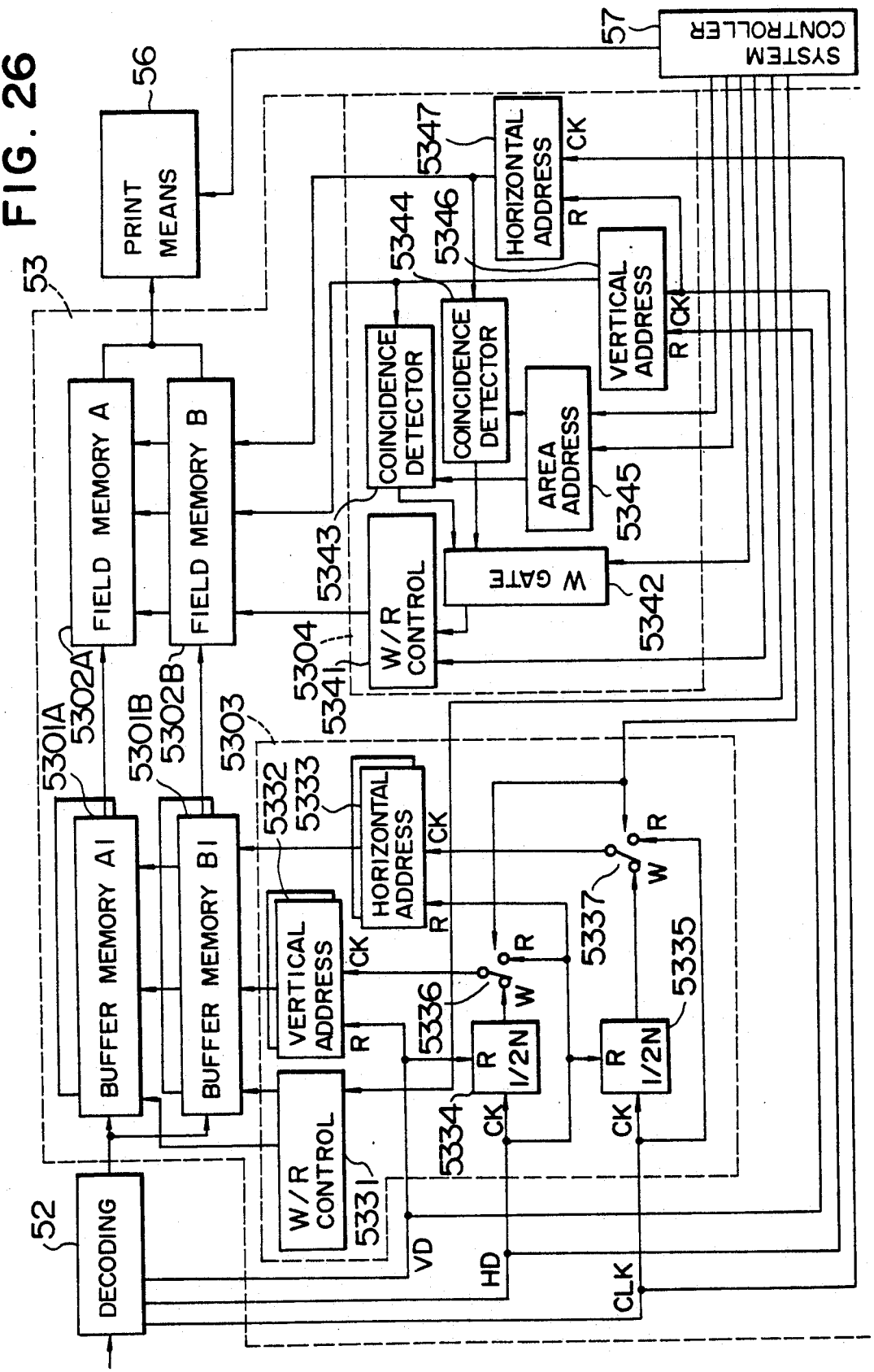
FIG. 26 is a block diagram showing a still further embodiment of the present invention.

Now, another embodiment of the present invention will be explained with reference to FIG. 26. The embodiment of FIG. 26 is for providing the print shown in FIG. 15. In FIG. 26, numeral 5301 designates a buffer memory, numeral 5302 a field memory, numeral 5303 buffer memory control means, and numeral 5304 field memory control means. The buffer memory control means 5303 in turn includes W/R control means 5331, vertical address means 5332, horizontal address means 5333, 2N frequency divider 5334, 2N frequency divider 5335, and clock switches 5336, 5337. The field memory control means 5304 includes W/R control means 5341, W gate means 5342, coincidence detection means 5343, 5344, area address means 5345, vertical address means 5346 and horizontal address means 5347.

In the above-mentioned configuration, the area address means 5345 is for supplying an address number of a reduced area (A, B, C, D ... in FIG. 15) in FIGS. 15 and 16. Also, the buffer memory 5301 is assumed to have four buffer memory units to facilitate the understanding.

Now, the operation of this circuit will be explained. First, digital images of successive fields are applied to the memory means 53 sequentially from the decode processing means 52 as shown in FIG. 15. These input digital images are thinned out along vertical/ horizontal direction and only the data making up a reduced image shown in FIG. 15 is written in the buffer memory 5301. Specifically, the image "A" in FIG. 15 is reduced and written in the buffer memories A1/B1 during a field. In the next field (the period of image "B" in FIG. 15), the data in the buffer memories A1/B1 are successively read and the image "B" in reduced form is written in the other buffer memories A2/B2. Subsequently, the images "C", "D" and so on are reduced sequentially and written in the buffer memories A1/B1 and A2/B2 and read out.

Now, the input image "A" is written in the two buffer memories A1 and A2 alternately between them by being switched for each horizontal scan (or horizontal period). Then, the data in the two buffer memories A1 and B1 are read at the same time, and written simultaneously in the same timing as the write area (the reduced section in FIG. 15) of the field memories A/B 5302 in the next stage. After that, A, B, C, D and so on, or 1, 2, 3, and so on are sequentially written, completing the writing of the successive reduced images in the field memory 5302 at P, respectively. The field memory 5302 is then read successively and the image of FIG. 15 is displayed on a monitor (not shown), and the same print as the monitored image is printed by the print means 56.

The operation of the buffer memory control means 5303 and the field memory control means 5304 will be explained in detail. First, the buffer memory control means 5303 retrieves only the required data into the buffer memory 5301 as shown in FIG. 27 at the time of writing. Along the horizontal direction, the address change in the horizontal address means against the transfer period of the input data (which is the same as the input clock CLK and assumed to be $T_{CLK}$) is $2N \cdot T_{CLK}$. In other words, the clock period of the horizontal address means 5333 is increased to double by the 2N frequency divider 5335. FIG. 27 shows the case of N=2 for division into 16 parts. Four successive data, 1-1, 1-2, 1-3 and 1-4 shown in FIG. 27(a), for example, are written in the same address. Only the data of 1-4, the last written, is held. Of the following four data (1-5 to 1-8), only the data of 1-8 is held in the next address, with the result that 128 data, that is, one fourth the 512 data, are written in the buffer memory A1 during a horizontal scanning period. (During the first horizontal scanning period, the A1 memory of the buffer memory 5301 is written). After that, during the horizontal scanning period when data is to be taken into the buffer memory 5301, 128 data are written in the field memory B1 in a similar manner. Then data are written alternately in the field memories A1 and B1.

As to the operation of the vertical address means 5332, it is supplied with a horizontal sync signal HD divided into 2N in frequency as an input clock. (N=2 in the embodiment under consideration as described above). As a result, the vertical address of the buffer memory 5301 shifts one during every four horizontal periods, so that the data associated with the assigned lines are written in the respective buffer memories shown in FIG. 27. During the horizontal period for the first two lines, data are held in the buffer memory A1, and during the horizontal period after the second line, the data are held in the buffer memory B1. This process is repeated until the data for 128 lines are held half by half in the buffer memories A1 and B1 from one field period (data of 256 lines) As a result, finally, of all the horizontal data, only the 4n-th data (n: 1 to 128) is held in the buffer memory 5301, while along the vertical data of the 4m-th line (m: 1 to 64) in the buffer memory B1. As a result, the data shown in FIG. 27(b) are held in the buffer memories A1 and B1. During the writing process of the buffer memory 5301, the memories A and B are switched by the W/R control means 331.

In reading the buffer memory 5301 on the next occasion, the clock of the vertical address means 5332 and the horizontal address means 5333 are applied thereto directly in the form of HD and CLK respectively. As a result, the same address appears four times at regular intervals of time during a field in the vertical direction, and so is along the horizontal direction. More specifically, when the output of the buffer memory 5301 is viewed through the monitor, the 16 divided parts on the right side of FIG. 15 are reproduced. The same image corresponding to each of the reduced 16 areas appears 16 times respectively. Such images are supplied to the field memory 5302 in the next stage.

Now, the operation of the field memory control means 5304 will be explained. The vertical/horizontal addresses of the field memory 5302 are controlled by the vertical address means 5346 and the horizontal address means 5347 respectively. These address means 5346 and 5347, with VD and HD signals applied to the reset terminal R and HD and with CLK signals applied to the clock terminal CK, generate an address in quite the same manner as in the read mode of the vertical address means 5332 and the horizontal address means 5333 in the buffer memory control means 5303. The reduced area read out of the buffer memory 5301 thus completely coincides in timing with the reduced area in the field memory 5302. In this way, by designating the reduced area to be written in the field memory 5302 as an output of the area address means 5345, therefore, the W/R control means 5341 generates a write command only for the particular area (such as area A in FIG. 15). At the same time, the system controller 57 supplies the area address means 5345 with (m, n) as the designated data (m-th line, n-th line) in the area of FIG. 15. The area address means 5345 produces two-bit addresses for both vertical and horizontal directions (in this embodiment), and these are compared with the most significant two bits (on MSB side) of each address in the coincidence detection means 5343 and 5344 respectively. The coincidence detection means 5343, 5344 both produce an output only during one reduced area period for each area data (m, n), so that the W gate means 5342 produces a coincidence signal to the W/R control means 5341 only during a common period shared by the two coincidence signals.

For this purpose, the order of writing the reduced areas (A to P in FIG. 15) and random area designation may be set as desired by appropriate design of the system controller 57. Also, it is possible to write the same reduced image in, say, a 16-image field memory 5302 by direct application of a signal from the system controller 57 to the W gate means 5342.

Further, if the area number is switched for each field, the successive storage of 16 divided parts is possible from successive field images as shown in FIG. 15. Input at intervals of several fields or manual input makes possible intermittent or interrupted field storage.

Figure 28:
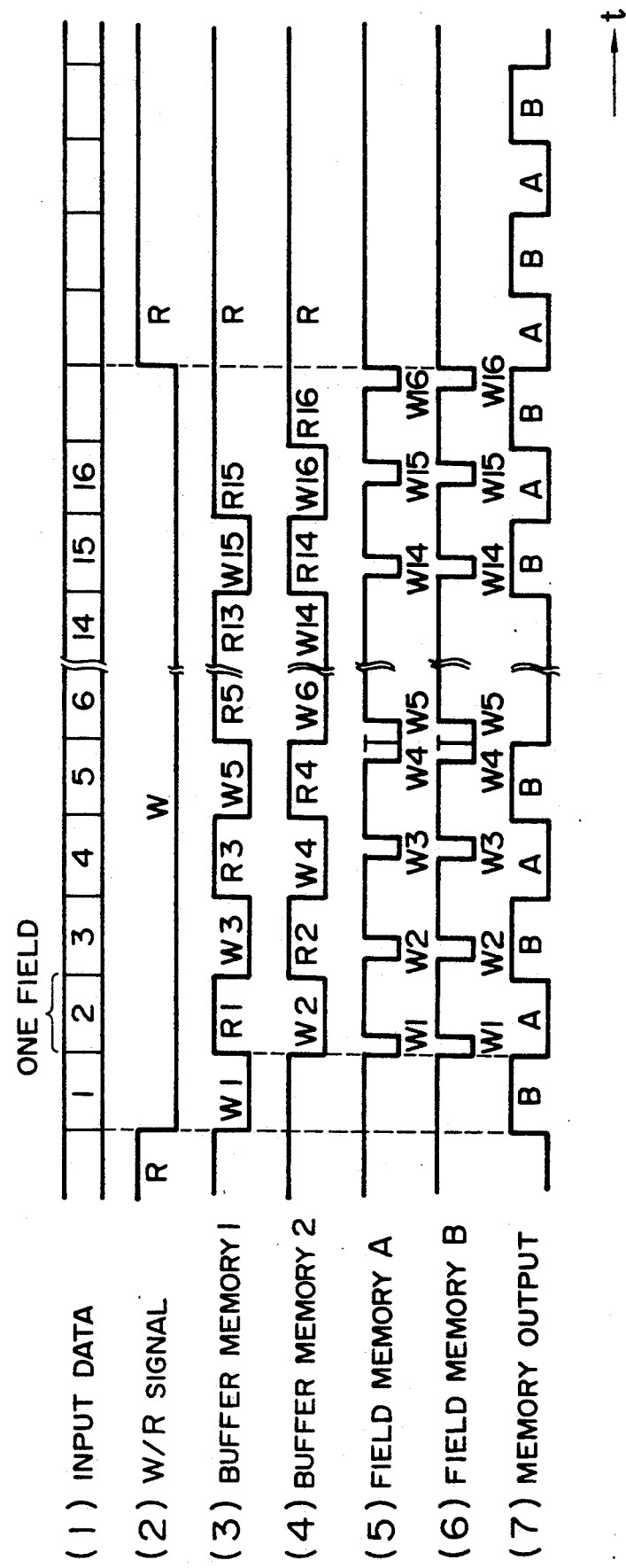
FIG. 28 shows waveforms produced at various components and is useful in explaining the operation of the invention.

In the above-mentioned embodiment, W/R operation of the four buffer memories A1/B1 and A2/B2 and the field memory 5302 are shown collectively in FIG. 28. By writing data at the same time in the field memories A/B 5302, it is possible to write successive fields. At the time of reading the field memories 5302, outputs of the field memories A/B are switched for each field, thereby reproducing an interlace signal capable of being displayed on a normal monitor. FIGS. 28(5) and (6) show the manner in which the numbers of the reduced areas written in the field memories 5302 undergo a sequential change as a change in pulse phase written diagrammatically.

In FIG. 26, the relationship between the buffer memories A1/B1 and the buffer memories A2/B2 is such that W/R thereof are always reverse. As a result, exclusive vertical address means 5332 and horizontal address means 5333 are necessary for them respectively. Nevertheless, their wirings are not shown to facilitate the understanding.

Also, although the case of 16 divided parts was explained with reference to FIGS. 26 to 28 with N as 2, other integers may be used as N. If N is 1, for example, divisions are four, if N is 3, divisions 36, and if N is 4, divisions 64.

Figure 29:
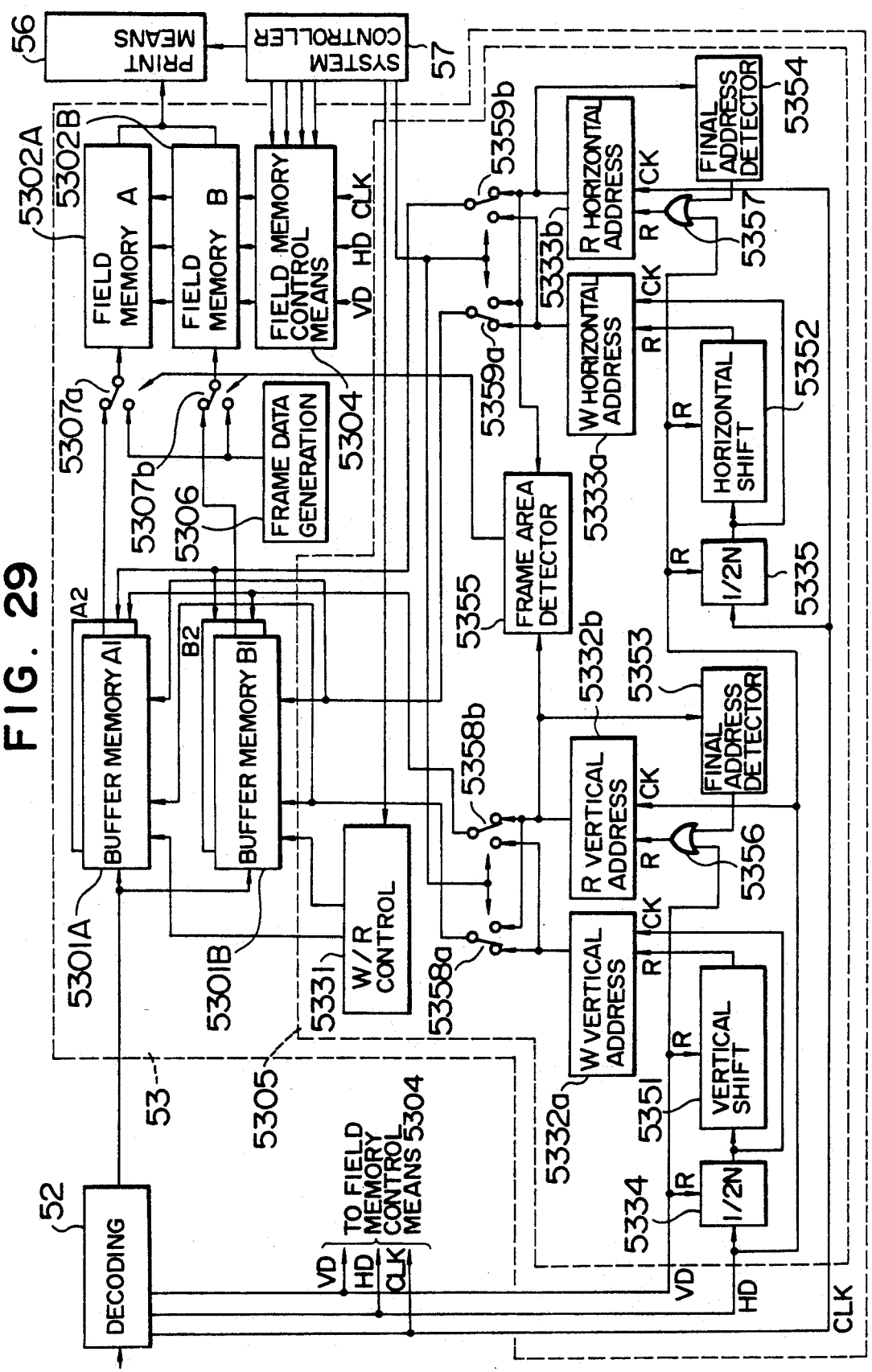
FIG. 29 is a block diagram showing a still further embodiment of the present invention.

Now, an embodiment of odd-numbered divided prints shown in FIG. 16 will be explained with reference to FIG. 29. In FIG. 29, those component parts having the same functions as corresponding parts in FIG. 26 are designated by the same reference numerals, respectively. Numeral 5305 designates buffer memory control means, numeral 5306 frame data generation means, and 5307 a data switch. The buffer memory control means 5305, in addition to the means 5331 to 5337 included in the buffer memory control means 5304 of FIG. 26, includes vertical shift means 5351, horizontal shift means 5352, final address detection means 5353, 5354, frame area detection means 5355, OR gates 5356, 5357 and address switches 5358, 5359.

Now, the operation of this circuit will be explained. In the explanation, the case of 25 screens will be taken up as in FIG. 16. For writing images in the buffer memory 5301, in the first place, the data are reduced to one fourth as explained with reference to FIG. 26 to take a field of data. As shown in FIGS. 28(3) and (4), the buffer memories A2/B2 are in a read field period when the buffer memories A1/B1 are in a write field period, and this correlationship is reversed in the next field period. The addresses of the buffer memories 5301 are controlled through the address switches 5358, 5359 by the vertical address means 5332 and horizontal address means 5333. The vertical address means 5332 includes write (W) vertical address means 5332a and the read (R) vertical address means 5332b, each having an address switch 5358a, 5358b to select reverse outputs of the vertical address means 5332, which are supplied to the buffer memories A1/B1, A2/B2. In similar manner, the horizontal address means 5333 includes the W horizontal address means 5333a and R horizontal address means 5333b and address switches 5359a, 5359b to supply addresses to the buffer memories 5301 in a manner similar to the vertical address means 5332.

First, the operation of the W horizontal address means 5333a will be explained with reference to FIG. 30. The 2N frequency divider 5335 and the horizontal shift means 5352 are reset (R) by an HD signal from the decode processing means 52. In the process, the output of the horizontal shift means 5352 is "H", for instance, and the 2N frequency divider 5355 frequency-divides the clock signal CLK by four (N being 2 in the case under consideration), and the frequency-divided clock CLK is supplied to the clock input terminal of the horizontal shift means 5352 and the W horizontal address means 5333a. Then, when the horizontal shift means 5352 counts a predetermined number (such as 14) of the frequency-divided clocks (CLK), the output thereof is reversed to "L" thereby to cancel the resetting of the W horizontal address means 5333a. As a consequence, the W horizontal address means 5333a becomes ready to count, thus updating the address value with each arrival of the frequency-divided CLK. After this address value reaches 128, subsequent counting operation loses its meaning. Thus, only data on and after the 15th line is held in the horizontal direction, as shown in FIG. 30(b), in the buffer memories A/B.

The 5000 (=50×100) data held in the buffer memories are repetitively read out by the R horizontal address means 5333b during the next field period while at the same time being supplied to the data switch 5307. The R horizontal address means 5333b is reset (R) by the HD signal and begins to count the clock signal CLK immediately thereafter. When the count proceeds to the final number (such as 100), the final address detection means 5354 detects the final number as the final address and applies a reset pulse through the OR gate 5357. As a result, the R horizontal address means 5333b is reset again, and begins to count from the address 0. This process of operation is repeated until the arrive of the next HD signal. One horizontal period contains 500-odd CLK pulses, and therefore it follows that data (8 - 15) to (8 - 114) on the first line, for example, are read at least five times repeatedly. Thus the data group (such as from 8 - 15 to 8 - 114) are read at least five times in the horizontal direction for each vertical address. The final address 100 was selected as one of the integers less than 512/5, and it is not necessarily limited to such a number.

Now, the operation of the vertical address means 5332 will be explained. In the vertical address means 5332, the horizontal operation of the horizontal address means 5333 is replaced by the operation of the vertical address means 5332. First, explanation will be made of the operation of the W vertical address means 5332a. In response to the VD signal from the decode processing means 52, the 2N frequency divider 5334 and the vertical shift means 5351 are reset (R). At the same time, the output of the vertical shift means 5351 becomes, say, "H" thereby to reset (R) the W vertical address means 5332a. After that, the 2N frequency divider 5334 frequency-divides the HD signal by four (N being 2 in the case under consideration), and supplies the divided HD signal to the clock terminal CK of the vertical shift means 5351 and the W vertical address means 5332a. The vertical shift means 5351, upon counting a predetermined number (say, 7) of frequency-divided HD signals, reverses the output thereof to "L", and thus cancels the reset condition of the W vertical address means 5332a. Then, the W vertical address means 5332a begins to count the frequency-divided HD signals, and supplies the count to the buffer memories 5301 through the address switch 5358 as a W vertical address. The data on and after the 8th line are thus held in the buffer memories A1 and B1 as shown in FIG. 30. Data on and after the 58th line may be written as desired.

The operation of the R vertical address means 5332b will be explained. The VD signal resets the R vertical address means 5332b through the OR gate 5356, which is immediately followed by the counting of the HD signals. When the count reaches the final number (say, 50), the final address detection means 5353 detects the final number as the final address, and applies a reset pulse through the OR gate 5356. As a result, the R vertical address means 5332b is reset again and begins again to count from the address 0. This process of operation is repeated until the arrival of the next VD signal. About 260 HD signals exist in a VD period, and therefore 50 lines of data from, say, lines 8 to 57 in FIG. 30(b) are read five times repeatedly in vertical direction.

In the manner described above, the vertical address means 5332 and the horizontal address means 5333 are subjected to read control, so that a total of 25 reduced images shown in FIG. 30(b), five each for vertical and horizontal (longitudinal and lateral respectively on the monitor), are read out. If the field memory 5302 and the field memory control means 5304 shown in FIG. 26 are used, therefore, a succession of 25 reduced images can be stored, and also, 25 copies of the same image may be stored at the same time.

The reduced images thus read out from the buffer memory 5301 are "framed" by the data switch 5307. Specifically, in response to a signal from a frame area detection means 5355, the data switch 5307 selects frame data from the frame data generation means 5306 and supplies it to the field memory 5302 in the next stage. The frame data is set to white, black or other desired hue. In particular, white is selected if the reduced divided images are separated for use. The operation of the frame area detection means 5355 will be explained. The frame area detection means 5355 is supplied with an R vertical address from the R vertical address means and an R horizontal address from the R horizontal address means 5333b. The frame area detection means 5355 detects an address to form a frame area from each R address and supplies it to the data switch as a frame area signal. A frame area is detected in the form of addresses contained in, say, two rows (15, 16 and 113, 114 as vertical data) at the extreme right and left ends and two lines (8, 9 and 56, 57 as horizontal data) at the upper and lower ends in FIG. 30(b). A frame detection signal is generated for each reduced image at the upper, lower, right and left areas, all of which are produced for all of the 25 images.

Figure 31:
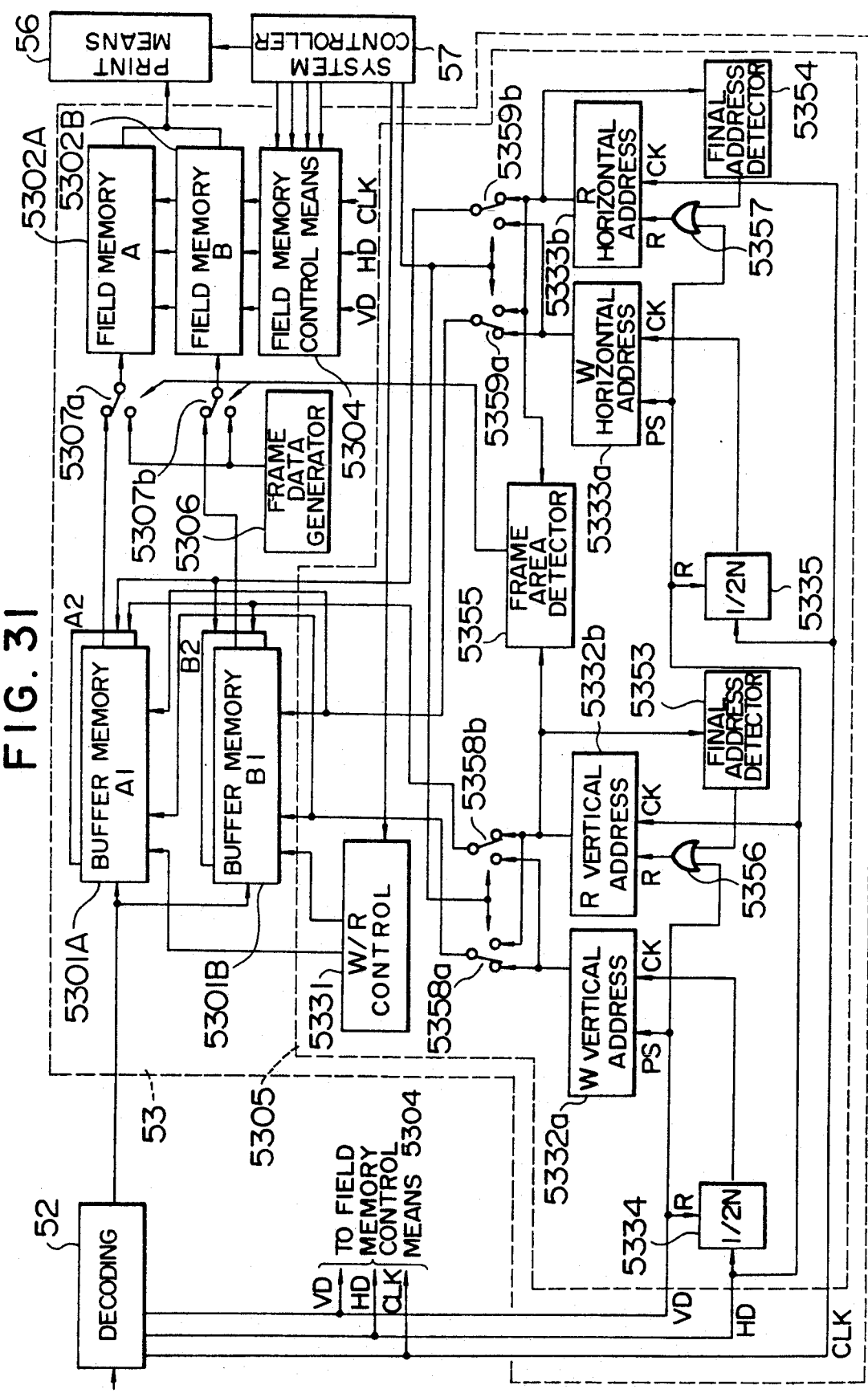
FIGS. 31 and 32 are block diagrams showing further embodiments of the present invention.

Another embodiment of the buffer memory control means 5305 shown in FIG. 29 will be explained with reference to FIG. 31. In FIG. 31, the component parts having the same functions as corresponding parts, in FIG. 29 will be designated by the same reference numerals, respectively. In FIG. 31, the R vertical address means 5332b and the R horizontal address means 5333b are of preset (PS) type, and the vertical shift means 5351 and the horizontal shift means 5352 in FIG. 29 are eliminated. The operation of component parts other than the vertical address means 5352 and the horizontal address means 5333 are similar to that in FIG. 29.

First, the operation of the horizontal address means 5333 will be explained. The W horizontal address means 5333a, after being reset by the HD signal, immediately beings to count the quadruple frequency clock signal CLK. As a result, all the horizontal data of FIG. 30(a) are written in the buffer memory 5301. When this memory 5301 is read, on the other hand, the R horizontal address means 5333b is preset (PS) at a predetermined value (say, 15) by the HD signal, followed by the address value being updated by the CLK. With the arrival of the final count (say, 114) of the address number, a preset pulse is produced from the final address detection means 5354 in a manner similar to the way in FIG. 29, thereby resetting the R horizontal address means 5333b again through the OR gate 5357. Subsequently, in similar manner, the horizontal address is produced repeatedly. The buffer memory 5301 thus produces reduced image data of FIG. 30(b) as in FIG. 29. The vertical address means 5332, on the other hand, functions in the same manner as if the horizontal direction is replaced by the vertical direction in the horizontal address means 5333. Specifically, the W vertical address means 5332a is reset by a VD signal thereby to count the quadruple frequency HD signal. As a result, all the data from the first line in the horizontal direction shown in FIG. 30 are written in the buffer memory 5301. For reading out the data, on the other hand, the R vertical address means 5332b is preset (PS) to a predetermined value (say, 8) by a VD signal, followed by counting the quadruple HD signal. The final address detection means 5353, upon detection of the final address (say, 57) of the R vertical address means 5332b, produces a preset pulse thereby to preset the R vertical address means 5332b again through the OR gate 5356. This process of operation is repeated. The reduced image shown in FIG. 30(b) is thus read out 25 times successively.

Although the foregoing description with reference to FIGS. 29 to 31 represents a case in which an image is reduced to one fourth along vertical and horizontal directions with N as 2 to write 25 (=5×5) reduced images, the invention is not limited to such a case. Alternatively, in the case where 9 (=3×3) images are involved, for example, an image is reduced to one half (256×256) along vertical and horizontal directions with N as 1 and are written in two buffer memories 5301 (256×128). When this data is read out, the parts (170×85) of the reduced images (256×128) are read repeatedly. If 49 (=7×7) images are involved, on the other hand, an image is reduced to one sixth (84×84) with N as 3, and the reduced images (84×42) are written in the buffer memory 5301. Of these images, the parts (72×36) are read out repeatedly.

In this way, when an odd number (2N+1) of reduced images are stored in the vertical and horizontal directions, an image is reduced to $\frac{1}{2}$N and written in the buffer memory 5301, so that images in an even number, not more than 512/(2N+1) are read in the horizontal direction and in a number half the even number in the vertical direction repeatedly and written in the field memory 5302.

Figure 32:
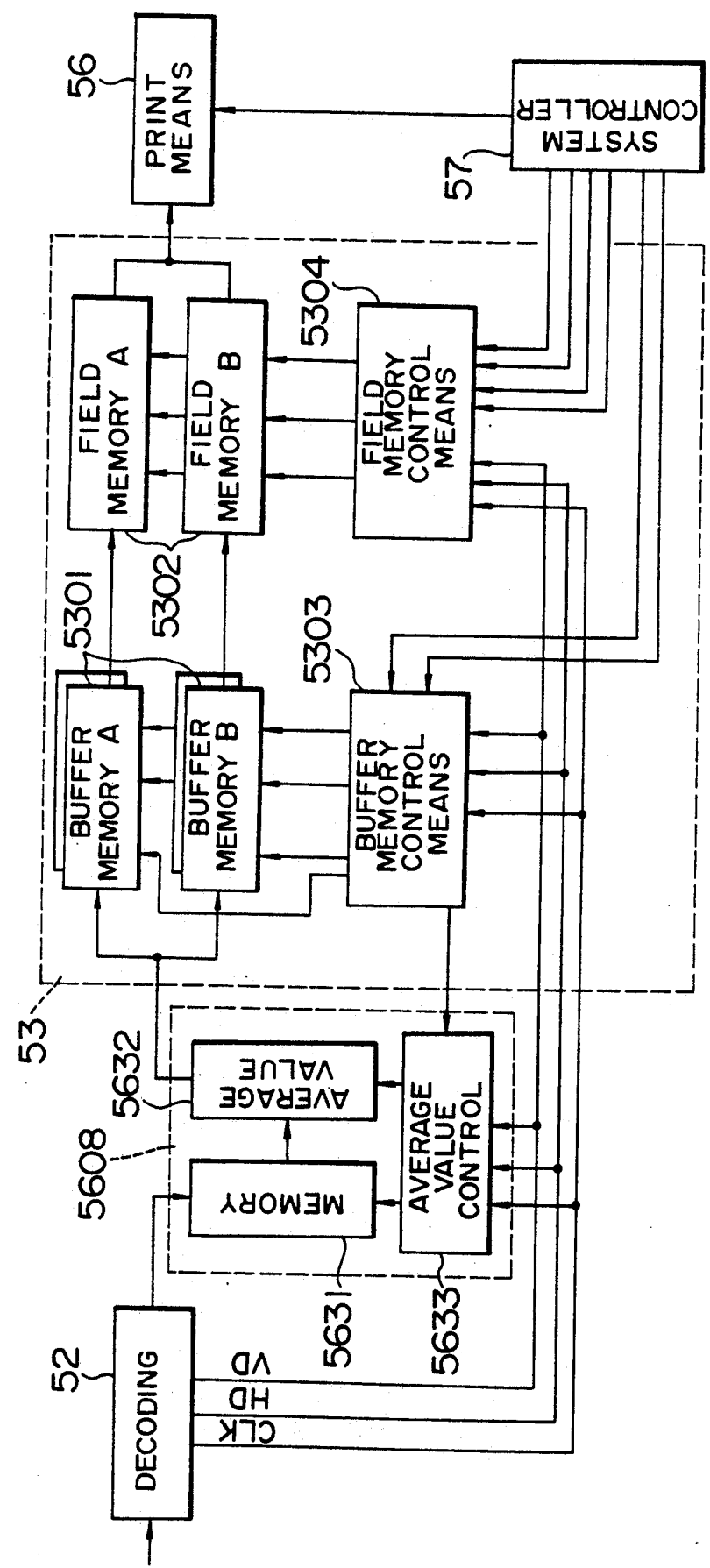

Now, an embodiment using the average value means 5608 of FIG. 25 in FIGS. 26, 29 and 31, showing a configuration for producing multiple-divided images of FIGS. 15 and 16, will be explained with reference to FIG. 32. In FIG. 32, as a typical cases of the configuration shown in FIGS. 26, 29 and 31, an embodiment is shown using the average value means 5608 of FIG. 23 in FIG. 26.

In FIG. 32, the same component parts as corresponding parts in FIG. 26 are designated by the same reference numerals, respectively. In FIG. 32, the average value means 5608 continuously produces average data by a write timing signal from the buffer memory control means 5303, so that the data are stored in reduced from at the time of being written in the buffer memory 5301. The average value means 5608 operates the same way as the corresponding means shown in FIG. 25. The other parts operate the same way as corresponding parts in FIG. 26, and the average reduced data are supplied to the buffer memory 5301 and the field memory means 5302 and printed by the print means 5608. The average value means 56 always produces average value data, which is reduced before being written in the buffer memory 5301.

Now, as to an embodiment for producing a printed image shown in FIG. 18, it is already provided by the configurations of FIGS. 26, 29, 31 and 32. Specifically, in the memory means 52 shown in FIGS. 26, 29, 31 and 32, the multiple-divided images shown in FIGS. 15 and 16 are produced, and at the same time may be combined with the embodiment shown in FIGS. 19, 21 and 23 as print means 56. FIG. 18 shows a case in which 16 independent, reduced images are stored in the field memory means 5302 and at the time of printing, are divided into four groups. In this way, by producing a print as shown in FIG. 18, a plurality of small index cards may be prepared at one time.

In the explanation of FIGS. 26 and 32, the operation was described as field memory means for successive storage of input images. The invention, however, is not limited to such an application. Instead, a write command for a reduction area may be designated intermittently or manually independently for each image from the system controller 57, thereby to write image by image in the field memory means.

It will thus be understood from the foregoing description that according to the present invention it is possible to produce two images of prints at a time, thus reducing the printing cost. Further, two photographed images are capable of being automatically stored and distributed in the right and left parts with the same camera angle. In addition, since two frame memories are provided, an image may be stored for rewrite or other processes while another image is being printed, thereby efficiently reducing the printed intervals.

Furthermore, according to the present invention, an image stored in a memory may be reduced in a multiplicity of copies and printed in the desired size for use as a seal or the like, and therefore possible applications of the printer are increased. Also, a multiplicity of images reduced in size may be prepared successively, independently or intermittently, and may be printed directly or in a multiplicity of subdivided images, thereby facilitating the preparation of index cards or the like.

We claim:

1. A printing apparatus for printing a print of images represented by video signals to provide a print having multiple images thereon, said apparatus comprising:
   input means for providing video signals representing images to be printed;
   analog/digital conversion means for converting said video signals from said input means into a digital signals;
   memory means having a plurality of memory areas for string said digital signals;
   printing means for printing a print of images represented by said stored digital signals;
   memory control means for storing a first digital signal in a first memory area of said memory means and storing a second digital signal in a second memory area of said memory means; and
   print control means for controlling said printing means to print a print having a plurality of print areas, with an image formed from the first stored digital signal printed in a first print area of the print and an image formed from the second stored digital signal printed in a second print area of the print, to provide a print containing multiple images.

2. A printing apparatus as claimed in claim 1 wherein said memory control means stores the first digital signal in a memory area of said memory means corresponding with a left half of the print and stores the second digital signal in a memory area of said memory means corresponding with a right half of the print.

3. A printing apparatus as claimed in claim 1 wherein said memory control means stores the first digital signal in a memory area of said memory means corresponding with an upper half of the print and stores the second digital signal in a memory area of said memory means corresponding with a lower half of the print.

4. A printing apparatus as claimed in claim 1 wherein said memory control means stores identical digital signals as the first digital signal and the second digital signal to provide a print containing multiple identical images.

5. A printing apparatus as claimed in claim 1 wherein said memory control means stores different digital signals as the first digital signal and the second digital signal to provide a print containing multiple images that are not identical.

6. A printing apparatus as claimed in claim 1, wherein said input means includes video signal input means for providing a first video signal representative of a video image, character signal input means for providing a second video signal representative of characters, and combining means for combining the first and second video signals, whereby at least one of the first digital signal and the second digital signal includes representations of the characters combined with the video image.

7. A printing apparatus as claimed in claim 6 wherein said character signal input means comprises a computer terminal.

8. A printing apparatus as claimed in claim 6 wherein said character signal input means comprises written characters and a video camera for providing a video signal representative of the written characters.

9. A printing apparatus as claimed in claim 1, wherein said input means includes video signal input means for providing a video signal image, and character signal input means for providing a digital character signal, and wherein said apparatus further comprises combining means for combining a digital signal produced from said video image signal by said analog/digital conversion means and the digital character signal to provide a combined digital signal for storage in said memory means, whereby at least one of the first digital signal and the second digital signal includes representations of characters combined with a video image.

10. A printing apparatus as claimed in claim 9 wherein said character signal input means comprises a computer terminal.

11. A printing apparatus as claimed in claim 9 wherein said character signal input means comprises written characters and a video camera for providing a video character signal representative of the written characters, the digital character signal being produced from said video character signal by said analog/digital conversion means.

12. A printing apparatus as claimed in claim 1, wherein:
   said memory means comprises buffer memory means for storing a digital signal representing each video pixel of an input video signal, and field memory means; and
   said control means includes means for storing in said field memory means the digital signals representing 1 of every N of the video pixels whose representations are stored in said buffer memory means, where N is an integer;
   whereby said apparatus provides a print containing reduced size images.

13. A printing apparatus as claimed in claim 1 further comprising:
   digital/analog conversion means for converting the digital signals stored by said memory means into analog signals; and
   monitor means for displaying the converted analog signal.

* * * * *